US008881049B2

(12) United States Patent
Kerr et al.

(10) Patent No.: US 8,881,049 B2
(45) Date of Patent: Nov. 4, 2014

(54) SCROLLING DISPLAYED OBJECTS USING A 3D REMOTE CONTROLLER IN A MEDIA SYSTEM

(75) Inventors: Duncan R. Kerr, San Francisco, CA (US); Nicholas V. King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1157 days.

(21) Appl. No.: 12/002,197

(22) Filed: Dec. 14, 2007

(65) Prior Publication Data

US 2009/0158203 A1 Jun. 18, 2009

(51) Int. Cl.
  *G06F 3/048* (2013.01)
  *G06F 3/01* (2006.01)
  *G06F 3/0485* (2013.01)
  *G06F 3/0346* (2013.01)

(52) U.S. Cl.
  CPC .............. *G06F 3/0485* (2013.01); *G06F 3/017* (2013.01); *G06F 3/04855* (2013.01); *G06F 2203/04806* (2013.01); *G06F 3/0346* (2013.01)
  USPC ......................................................... 715/784

(58) Field of Classification Search
  USPC .................................. 715/783–787; 345/684
  See application file for complete search history.

(56) References Cited

U.S. PATENT DOCUMENTS

| | | | |
|---|---|---|---|
| 5,097,252 A | 3/1992 | Harvill | |
| 5,302,968 A | 4/1994 | Heberle | |
| 5,467,288 A | 11/1995 | Fasciano et al. | |
| 5,554,980 A | 9/1996 | Hashimoto et al. | |
| 5,903,229 A * | 5/1999 | Kishi | 341/20 |
| 6,184,884 B1 | 2/2001 | Nagahara et al. | |
| 6,424,338 B1 * | 7/2002 | Anderson | 345/173 |
| 6,433,801 B1 * | 8/2002 | Moon et al. | 715/840 |
| 6,476,797 B1 | 11/2002 | Kurihara et al. | |
| 6,538,665 B2 | 3/2003 | Crow et al. | |
| 6,545,687 B2 * | 4/2003 | Scott et al. | 345/629 |
| 6,972,749 B2 * | 12/2005 | Hinckley et al. | 345/173 |

(Continued)

FOREIGN PATENT DOCUMENTS

| | | |
|---|---|---|
| CN | 1877506 A | 12/2006 |
| WO | WO-2004057454 A2 | 7/2004 |
| WO | WO-2007060287 A1 | 5/2007 |

OTHER PUBLICATIONS

U.S. Appl. No. 12/002,198, Final Office Action mailed May 24, 2013, 40 pgs.

(Continued)

*Primary Examiner* — Phenuel Salomon
(74) *Attorney, Agent, or Firm* — Schwegman Lundberg & Woessner, P.A.

(57) ABSTRACT

An electronic device associated with a remote wand controlling the operations of the electronic device is provided. The wand may include a motion detection component operative to provide an output reflecting the motion of the wand to the electronic device, such that the movements of a cursor displayed by the electronic device may be related to the output of the motion detection component. The wand may also include an input mechanism operative to receive user inputs. Using the input mechanism, the wand may detect a user's inputs and direct the electronic device to zoom or scroll displayed objects. The electronic device may display a screen saver by which the user may select particular media items for playback while remaining in the screen saver mode. In some embodiments, the electronic device may display video with a scroll bar that includes a preview window of the video.

25 Claims, 13 Drawing Sheets

(56) References Cited

U.S. PATENT DOCUMENTS

| | | | |
|---|---|---|---|
| 7,155,305 B2* | 12/2006 | Hayes et al. | 700/224 |
| 7,165,227 B2 | 1/2007 | Ubillos | |
| 7,219,308 B2 | 5/2007 | Novak et al. | |
| 7,458,025 B2 | 11/2008 | Crow et al. | |
| 7,496,277 B2 | 2/2009 | Ackley et al. | |
| 7,696,980 B1 | 4/2010 | Piot et al. | |
| 7,705,799 B2* | 4/2010 | Niwa | 345/1.1 |
| 7,728,823 B2* | 6/2010 | Lyon et al. | 345/173 |
| 7,954,065 B2 | 5/2011 | Ubillos | |
| 7,984,385 B2 | 7/2011 | Ubillos | |
| 8,194,037 B2 | 6/2012 | Kerr et al. | |
| 8,341,544 B2 | 12/2012 | Kerr | |
| 2001/0002830 A1 | 6/2001 | Rahn et al. | |
| 2001/0050672 A1 | 12/2001 | Kobayashi | |
| 2002/0045960 A1* | 4/2002 | Phillips et al. | 700/94 |
| 2002/0180767 A1* | 12/2002 | Northway et al. | 345/698 |
| 2003/0050092 A1* | 3/2003 | Yun | 455/556 |
| 2003/0076301 A1* | 4/2003 | Tsuk et al. | 345/159 |
| 2003/0095096 A1* | 5/2003 | Robbin et al. | 345/156 |
| 2003/0201984 A1 | 10/2003 | Falvo | |
| 2003/0201999 A1 | 10/2003 | Lin et al. | |
| 2003/0210286 A1* | 11/2003 | Gerpheide et al. | 345/863 |
| 2004/0070564 A1 | 4/2004 | Dawson et al. | |
| 2004/0145593 A1* | 7/2004 | Berkner et al. | 345/619 |
| 2004/0218104 A1 | 11/2004 | Smith et al. | |
| 2004/0261037 A1 | 12/2004 | Ording et al. | |
| 2005/0012723 A1* | 1/2005 | Pallakoff | 345/173 |
| 2005/0041044 A1 | 2/2005 | Gannon et al. | |
| 2005/0055624 A1 | 3/2005 | Seeman et al. | |
| 2005/0102634 A1* | 5/2005 | Sloo | 715/823 |
| 2005/0134578 A1* | 6/2005 | Chambers et al. | 345/184 |
| 2005/0174324 A1 | 8/2005 | Liberty et al. | |
| 2005/0212749 A1 | 9/2005 | Marvit et al. | |
| 2005/0212766 A1 | 9/2005 | Reinhardt et al. | |
| 2006/0026521 A1* | 2/2006 | Hotelling et al. | 715/702 |
| 2006/0026535 A1 | 2/2006 | Hotelling et al. | |
| 2006/0095331 A1 | 5/2006 | O'Malley et al. | |
| 2006/0123360 A1 | 6/2006 | Anwar et al. | |
| 2006/0184966 A1 | 8/2006 | Hunleth et al. | |
| 2006/0193538 A1 | 8/2006 | Vronay et al. | |
| 2006/0227153 A1* | 10/2006 | Anwar et al. | 345/660 |
| 2006/0262105 A1 | 11/2006 | Smith et al. | |
| 2007/0033515 A1* | 2/2007 | Sull et al. | 715/500.1 |
| 2007/0067798 A1 | 3/2007 | Wroblewski | |
| 2007/0247435 A1 | 10/2007 | Benko et al. | |
| 2008/0106517 A1 | 5/2008 | Kerr et al. | |
| 2008/0235617 A1* | 9/2008 | Kim et al. | 715/786 |
| 2009/0158222 A1 | 6/2009 | Kerr et al. | |
| 2010/0058220 A1 | 3/2010 | Carpenter | |
| 2010/0303440 A1 | 12/2010 | Lin et al. | |
| 2011/0035700 A1 | 2/2011 | Meaney et al. | |
| 2011/0235990 A1 | 9/2011 | Anzures et al. | |
| 2011/0235998 A1 | 9/2011 | Pond et al. | |
| 2011/0276881 A1 | 11/2011 | Keng et al. | |
| 2013/0151967 A1 | 6/2013 | Kerr et al. | |

OTHER PUBLICATIONS

U.S. Appl. No. 12/002,053, Examiner Interview Summary mailed Apr. 24, 2012, 3 pgs.

U.S. Appl. No. 12/002,053, Non Final Office Action mailed Jan. 20, 2012, 20 pgs.

U.S. Appl. No. 12/002,053, Notice of Allowance mailed Aug. 17, 2012, 8 pgs.

U.S. Appl. No. 12/002,053, Response filed May 18, 2012 to Non Final Office Action mailed Jan. 20, 2012, 21 pgs.

U.S. Appl. No. 12/002,063, Examiner Interview Summary mailed Sep. 27, 2011, 3 pgs.

U.S. Appl. No. 12/002,063, Final Office Action mailed Jun. 27, 2011, 12 pgs.

U.S. Appl. No. 12/002,063, Non Final Office Action mailed Jan. 18, 2011, 12 pgs.

U.S. Appl. No. 12/002,063, Notice of Allowance mailed Apr. 11, 2012, 9 pgs.

U.S. Appl. No. 12/002,063, Notice of Allowance mailed Dec. 6, 2011, 10 pgs.

U.S. Appl. No. 12/002,063, Response filed Apr. 7, 2011 to Non Final Office Action mailed Jan. 18, 2011, 14 pgs.

U.S. Appl. No. 12/002,063, Response filed Nov. 22, 2011 to Final Office Action mailed Jun. 27, 2011, 15 pgs.

U.S. Appl. No. 12/002,198 , Response filed Mar. 25, 2013 to Non Final Office Action mailed Oct. 25, 2012, 15 pgs.

U.S. Appl. No. 12/002,198, Examiner Interview Summary mailed Apr. 2, 2013, 3 pgs.

U.S. Appl. No. 12/002,198, Examiner Interview Summary mailed Dec. 21, 2011, 3 pgs.

U.S. Appl. No. 12/002,198, Final Office Action mailed Jul. 19, 2011, 25 pgs.

U.S. Appl. No. 12/002,198, Non Final Office Action mailed Mar. 22, 2011, 15 pgs.

U.S. Appl. No. 12/002,198, Non Final Office Action mailed Oct. 25, 2012, 28 pgs.

U.S. Appl. No. 12/002,198, Response filed Feb. 9, 2011 to Restriction Requirement mailed Jan. 12, 2011, 2 pgs.

U.S. Appl. No. 12/002,198, Response filed Jun. 17, 2011 to Non Final Office Action mailed Mar. 22, 2011, 12 pgs.

U.S. Appl. No. 12/002,198, Response filed Dec. 19, 2011 to Final Office Action mailed Jul. 19, 2011, 12 pgs.

U.S. Appl. No. 12/002,198, Restriction Requirement mailed Jan. 12, 2011, 6 pgs.

U.S. Appl. No. 60/967,835, Application filed Sep. 7, 2007.

"Wii Operations Manual—Channels and Settings", (2007), 37 pgs.

"Wii Operations Manual—System Setup", (2007), 19 pgs.

\* cited by examiner

SCROLLING DISPLAYED OBJECTS USING A 3D REMOTE CONTROLLER IN A MEDIA SYSTEM

BACKGROUND OF THE INVENTION

This invention is related to controlling a media system using a remote controller.

Some existing media systems may be controlled using a variety of different input mechanisms. For example, some media systems may be controlled by a user providing inputs directly on an interface of the media system (e.g., by pressing buttons incorporated on the media system, or by touching a touch-screen of the media system).

As another example, some media systems may be controlled by a user providing inputs remotely from the media system (e.g., using a remote controller). Some remote controllers may include one or more buttons that the user can press to direct the media system to perform one or more operations. The buttons may be operative to automatically perform one or more media system operations, or the buttons may be operative to select options displayed on-screen. In some embodiments, some remote controllers may provide the user inputs associated with the one or more buttons to the media system using a short-range communications protocol, such as, for example, infrared or radio frequency protocols. To ensure that the user input is properly received, the user may point the remote controller to a receiver of the media system to transmit the user input.

Using these mechanisms to provide inputs to the media system, the user may provide inputs by pressing buttons with their fingers, or by moving their fingers across or on the mechanisms. Although such mechanisms may be effective, they may also be inefficient and non-intuitive, which may sometimes lead to frustration.

SUMMARY OF THE INVENTION

A media system in which a user may control a media application operation by moving a wand is provided.

The media system may include an electronic device, a screen, and a wand. The user may interact with one or more media applications implemented on the electronic device using the wand. The wand may include any suitable components for providing instructions to the electronic device. For example, the wand may include a motion detection component providing outputs reflecting the movements of the wand to the electronic device. As another example, the wand may include an input mechanism for receiving inputs from the user, and operative to provide the received inputs to the electronic device. The input mechanism may include any suitable input mechanism, including for example an input mechanism operative to detect movements of a user's finger (e.g., a touch screen, touchpad or touch strip).

The electronic device may perform any suitable operation in response to receiving an output (e.g., generated by a motion detection component) or input (e.g., received from an input mechanism) from the wand. In some embodiments, the user may control the position of a cursor displayed on the electronic device screen by moving the wand. In response to receiving corresponding outputs from the motion detection component, the electronic device may displace the cursor. In some embodiments, the user may wish to re-center the cursor. To do so, the user may select a centering option displayed on screen, provide a particular input using the input mechanism, or move the wand in a particular manner (e.g., swing the wand a particular number of times) to direct the motion detection component to provide an output associated with centering the wand to the electronic device. In some embodiments, the electronic device may detect when the wand is moving unintentionally (e.g., due to hand drift or the wand falling) and may automatically center the cursor or ignore initial subsequent wand movements to overcome the hand drift.

When an object is displayed by the electronic device, the user may zoom the display to access a more detailed view of the object. The user may provide the zooming instruction using any suitable approach. In some embodiments, the user may provide a zooming input using the input mechanism of the wand. For example, the user may slide a finger across the input mechanism to direct the electronic device to zoom the displayed object. If several objects are displayed and zoomed, the electronic device may change the position of the objects on the screen to maintain the ordering of the objects.

The user may also scroll several displayed objects. In some embodiments, the user may provide different instructions to scroll the objects in different manners. For example, the user may provide a first scrolling instruction to perform a fine scroll, and a second scrolling instruction to perform a coarse scroll. As another example, the user may provide a first instruction to scroll displayed objects and a second instruction to scroll through categories of objects. In some embodiments, the user may provide the first and second instructions by providing different inputs on the same input mechanism. For example, the user may slide a finger on the input mechanism along a first axis to provide the first instruction, and slide a finger on the input mechanism along a second axis different than the first to provide the second instruction.

The electronic device may use any suitable approach for receiving textual inputs from the user. For example, the electronic device may display a keyboard with selectable keys. The user may place a cursor over a key and provide a selection instruction to enter the selected key in a text window. To access different keys (e.g., from a display of letters to a display of numbers and characters), the user may provide any suitable instruction to the electronic device. For example, the user may select a displayed option, or the user may provide an input using the input mechanism of the wand (e.g., slide the user's finger across the input mechanism). In some embodiment, the input provided for zooming objects and for changing the keys displayed in a keyboard may be the same or substantially the same.

The user may control the playback of media using any suitable approach. In some embodiments, in response to receiving a user instruction to control the playback of a media item, the electronic device may display a playback scroll bar that includes an indicator. The user may move the indicator along the scroll bar to change the current playback position of the media. If the media includes video or images, the indicator may include a video region. As the user moves the indicator, the electronic device may display a video frame associated with the current position of the indicator in the video region (e.g., and roughly corresponding to the playback position of the media and of the location of the indicator on the scroll bar). To reduce the resources used to display images in the video region, the electronic device may display low resolution video frames in the video region.

The electronic device may enable or access a screen saver mode in response to determining that the user has not provided inputs before a period of time lapsed. In some embodiments, the electronic device may provide an interactive screen saver. For example, the electronic device may display several selectable images, which may move or float across the display. In response to receiving a user selection of an image, the electronic device may display several listings for media items associated with the selected image. The user may then select a displayed listing to direct the electronic device to play back the selected media item associated with the selected listing without disabling or exiting the screen saver mode.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
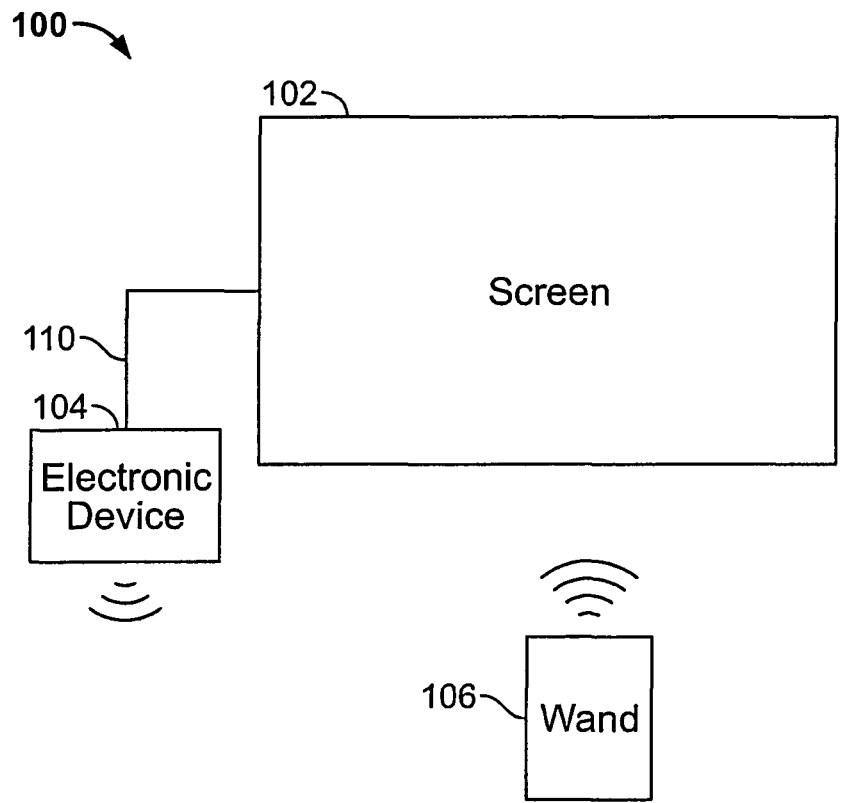
FIG. 1 is a schematic view of an illustrative media system by which a user may control the display of a screen based on the orientation of a remote wand in accordance with one embodiment of the invention.

FIG. 1 is a schematic view of an illustrative media system by which a user may control the display of a screen based on the orientation of a remote wand in accordance with one embodiment of the invention. Other illustrative media systems used with wands are described in commonly owned U.S. Provisional Patent Application No. 60/967,835, filed Sep. 7, 2007, which is incorporated herein in its entirety.

As shown in FIG. 1, media system 100 may include screen 102, electronic device 104 and wand 106. Screen 102 may be any suitable screen or display for displaying media or other content to a user. For example, screen 102 may be a television, a projector, a monitor (e.g., a computer monitor), a media device display (e.g., a media player or video game console display), a communications device display (e.g., a cellular telephone display), a component coupled with a graphical output device, any combinations thereof, or any other suitable screen.

Electronic device 104 may be coupled to screen 102 by link 110. Link 110 may be any suitable wired link, wireless link, or any suitable combination of such links for providing media and other content from electronic device 104 to screen 102 for display. For example, link 110 may include a coaxial cable, multi cable, optical fiber, ribbon cable, High-Definition Multimedia Interface (HDMI) cable, Digital Visual Interface (DVI) cable, component video and audio cable, S-video cable, DisplayPort cable, Visual Graphics Array (VGA) cable, Apple Display Connector (ADC) cable, USB cable, Firewire cable, or any other suitable cable or wire for coupling electronic device 104 with screen 102. As another example, link 110 may include any suitable wireless link for coupling electronic device 104 with screen 102. The wireless link may use any suitable wireless protocol including, for example, cellular systems (e.g., 0G, 1G, 2G, 3G, or 4G technologies), short-range radio circuitry (e.g., walkie-talkie type circuitry), infrared (e.g., IrDA), radio frequency (e.g., Dedicated Short Range Communications (DSRC) and RFID), wireless USB, Bluetooth, Ultra-wideband, high frequency systems (e.g., 900 MHz, 2.4 GHz, and 5.6 GHz communication systems), wireless local area network protocols (e.g., WiFi and Hiperlan), or any other suitable wireless communication protocol.

Electronic device 104 may include any suitable electronic device or component (as, a processor, camera circuitry and a display) for providing content for display to screen 102. For example, the electronic device may be operative to provide one or more output signal representing content, display screens, interactive elements, or any other suitable object operative to be displayed on screen 102. Upon receiving an output signal from electronic device 104, screen 102 may be operative to display the content or objects represented by the output signal. The content may include, for example, media (e.g., music, video and images), guidance screens (e.g., guidance application screens), software displays (e.g., Apple iTunes screens or Adobe Illustrator screens), prompts for user inputs, or any other suitable content. In some embodiments, electronic device 104 may be operative to generate content or displays that may be provided to screen 102. For example, electronic device 104 may include a desktop computer, a laptop or notebook computer, a personal media device (e.g., an iPod), a cellular telephone, a mobile communications device, a pocket-sized personal computer (e.g., an iPAQ or a Palm Pilot), a camera, a video recorder, a set-top box, or any other suitable electronic device.

In some embodiments, electronic device 104 may instead or in addition be operative to transmit content from a host device (not shown) to screen 102. For example, electronic device 104 may include a routing device, a device for streaming content to screen 102, or any other suitable device. In some embodiments, electronic device 104 may include an Apple TV sold by Apple Inc. of Cupertino, Calif. Electronic device 104 may be operative to receive content from the host device in any suitable manner, including any of the wired or wireless links described above in connection with link 110. The host device may be any suitable device for providing content to electronic device 102.

The following example will serve to illustrate an embodiment of this system. The host device may be a computer on which media is stored and played back using any suitable media application (e.g., iTunes or Windows Media Player). The electronic device may be an Apple TV device. Using a WiFi (e.g., 802.11) communications protocol, the Apple TV device may synch with the iTunes software on the host computer to provide listings of content available on a television screen. In response to a user selection of particular media content using a remote controller associated with the Apple TV device, the Apple TV device may stream the selected media content from the computer, and provide the streamed content to the television screen in high definition over an HDMI connection. Thus, the user may view the content stored on the host computer on a larger television screen.

To control media system 100, the user may provide instructions to electronic device 104 using wand 106 coupled to electronic device 104. Wand 106 may include any suitable input device for providing user instructions to electronic device 104. Wand 106 may be formed into any suitable shape, including for example an elongated object, a round object, a curved object, a rectangular object, or any other suitable shape. Wand 106 may be operative to wirelessly transmit user instructions to electronic device 104 using any suitable wired or wireless communications protocol, including those described above in connection with link 110. For example, wand 106 may be operative to transmit instructions using an infrared communications protocol by which information is transmitted from wand 106 to an IR module incorporated within electronic device 104. As another example, wand 106 may communicate with electronic device 104 using a Bluetooth or WiFi communications protocol.

Wand 106 may include one or more input mechanisms (e.g., buttons, switches touch screen or touchpad) for providing user inputs to electronic device 104. In some embodiments, the input mechanism may include positioning or moving the wand in a specific manner. For example, wand 106 may be operative to identify a user input in response to the user flicking, spinning, rolling or rotating the wand in a particular direction or around a particular axis. As an illustration, a flick of the wrist may rotate wand 106, causing wand 106 to provide a SELECT or other instruction to electronic device 104. The user may move wand 106 in any direction with respect to the x axis (e.g., movement left and right on the screen), y axis (e.g., movement up and down on the screen), and z axis (e.g., movement back and forth from the screen).

Wand 106 may be operative to control a cursor (e.g., a pointer or a highlight region) displayed on screen 102 to access operations provided by electronic device 104. In some embodiments, the user may control the displacement of the cursor by the displacement of wand 106. Media system 100 may use any suitable approach for correlating the movement of wand 106 with the position of a cursor. For example, wand 106 may include one or more accelerometers, gyroscopes, or other motion detection components. Wand 106 may be operative to transmit motion detected by the motion detection component to electronic device 104. For example, wand 106 may identify motion in the x-y plane, and transmit the motion to electronic device 104, which may direct display screen 102 to displace a cursor in accordance with the motion of wand 106. Wand 106 may also include an input mechanism (e.g., a wheel or a touch strip) for providing inputs in the z direction to electronic device 104 (e.g., instead of or in addition to identifying motion of wand 106 in the z direction).

As another example for correlating the movement of wand 106 with the position of a cursor, any suitable number of IR modules (e.g., 2 modules) may be provided in the vicinity of screen 102. The IR modules may be operative to emit infrared light for detection by wand 106. Wand 106 may be operative to detect the light emitted by the IR modules, and determine its position and orientation relative to screen 106 by identifying its position and orientation relative to the IR modules. Wand 106 may be operative to transmit the position and orientation information to electronic device 104, which may convert the position and orientation information into coordinates for the cursor or into an action to be performed (e.g., zoom in or scroll). In some embodiments, wand 106 may be operative to convert the position and orientation information into coordinates for the cursor or an action to be performed, and transmit the coordinates or action to electronic device 104.

In some embodiments, wand 106 may be operative to emit infrared light, and the IR modules may be operative to receive the light emitted by wand 106. The IR modules and electronic device 104 may then be operative to determine, based on the angle at which the light emitted by wand 106 is received, and based on the intensity of the received light, the position of wand 106 relative to the IR modules.

In some embodiments, media system 100 may include a plurality of wands 106, for example one for each user. For the sake of clarity, only one wand 106 is shown in FIG. 1. Each wand may be operative to control a different cursor, or a different portion of the screen. In some embodiments, each wand may have a different priority such that when more then one wand is in use, the wand with the highest priority controls operations displayed on screen 102. In some embodiments, each wand 106 may be operative to provide a unique signal to electronic device 104, thus allowing electronic device 104 to identify the user of media system 100, and thus provide a user-specific media experience (e.g., load user-specific settings or preferences, or provide user-specific media).

Figure 2:
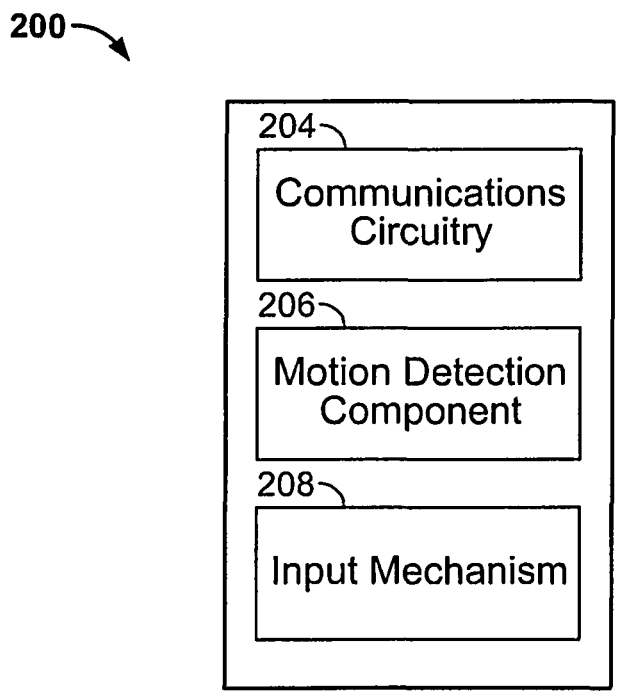
FIG. 2 is a schematic view of a wand in accordance with one embodiment of the invention.

FIG. 2 is a schematic view of a wand in accordance with one embodiment of the invention. Illustrative wand 200 may include communications circuitry 204, motion detection component 206 and input mechanism 208. Communications circuitry 204 may be operative to transmit position and orientation information and user inputs from wand 200 to the electronic device (e.g., electronic device 104, FIG. 1) using any suitable communications protocol, including for example any communications protocol described above in connection with FIG. 1. In some embodiments, communications circuitry 204 may include a processor, memory, a wireless module and an antenna. The processor may be operative to control the wireless module for transmitting data stored or cached in the memory.

Communications circuitry 204 may transmit any suitable data. For example, the processor may be operative to transmit motion information received from motion detection component 206 (e.g., acceleration signals) and user inputs received from input mechanism 208. In some embodiments, the process may temporarily store the data in the memory to organize or process the relevant data prior to transmission by the wireless module. In some embodiments, the wireless module may transmit data at predetermined time intervals, for example every 5 ms. The wireless module may be operative to modulate the data to be transmitted on an appropriate frequency, and may transmit the data to electronic device 104. The wireless module may use any suitable communications protocol, including for example Bluetooth.

Motion detection component 206 may be operative to detect the movement of wand 200 as a user moves the wand. Motion detection component 206 may include any suitable element for determining a change in orientation of the wand. For example, motion detection component 206 may include one or more three-axes acceleration sensors that may be operative to detect linear acceleration in three directions (i.e., the x or left/right direction, the y or up/down direction, and the z or forward/backward direction). As another example, motion detection component 206 may include one or more two-axis acceleration sensors which may be operative to detect linear acceleration only along each of x or left/right and y or up/down directions (or any other pair of directions). In some embodiments, the acceleration sensor may include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

Because in some embodiments motion detection component 206 may include only linear acceleration detection devices, motion detection component 206 may not be operative to directly detect rotation, rotational movement, angular displacement, tilt, position, orientation, motion along a non-linear (e.g., arcuate) path, or any other non-linear motions. Using additional processing, however, motion detection component 206 may be operative to indirectly detect some or all of these non-linear motions. For example, by comparing the linear output of motion detection component 206 with a gravity vector (i.e., a static acceleration), motion detection component 206 may be operative to calculate the tilt of wand 200 with respect to the y-axis.

In some embodiments, motion detection component 206 may include one or more gyro-sensors or gyroscopes for detecting rotational movement. For example, motion detection component 206 may include a rotating or vibrating element. In some embodiments, motion detection component 206 used in wand 200 may be operative to detect motion of wand 200 in the x-y plane (e.g., left/right and up/down movements of wand 200) so as to move a cursor or other element displayed on the screen (e.g., on screen 102, FIG. 1). For example, movement of wand 200 in the x-direction detected by motion detection component 206 may be transmitted to the electronic device associated with wand 200 to cause a cursor or another element of a display to move in the x-direction. To move a cursor or an element of the screen in the z-direction (e.g., when advancing into the screen in 3-D displays, or for zooming a display), wand 206 may include a separate input mechanism (described below).

The electronic device may define distinct acceleration curves, displacement curves, or velocity curves associated with different motion detection components or different axes for which motion detection components provide outputs. The different curves (e.g., acceleration curves) may be used to translate the physical movement of the wand into virtual movement of the cursor or other objects displayed by the electronic device to more closely reflect the user's intention when moving the wand. For example, different acceleration curves may be defined to account for the different ranges of motion of the user's hand, wrist or arm in different axes.

Input mechanism 208 may be any suitable mechanism for receiving user inputs. For example, input mechanism 208 may include a button, keypad, dial, a click wheel touchpad, a touch-sensitive input mechanism, a touchpad, or a touch screen. In some embodiments, the input mechanism may include a multi-touch screen such as that described in U.S. patent application Ser. No. 11/038,590, filed Jan. 18, 2005, which is incorporated by reference herein in its entirety. In some embodiments, input mechanism 208 may include a mechanism for providing inputs in the z-direction, and motion detection component 206 may provide inputs for movement in the x and y-directions. For example, input mechanism 208 may include a scroll wheel, touchpad, touch screen, arrow keys, joystick, or other suitable mechanism. In some embodiments, the z-direction mechanism may be operative to detect finger and thumb swipes in different directions. For example, swipes in one direction (e.g., up/down) may be provided to zoom or scroll the display, and swipes in another direction (e.g., left/right) may be provided to control playback of a track (e.g., fast forward/rewind or next/last).

In some embodiments, input mechanism 208 may include a mechanism for enabling communications circuitry 204 or motion detection component 206. For example, in response to receiving a user input on the motion enabling mechanism, wand 200 may enable motion detection component 206 to detect the user's movements of wand 200, and may direct communications circuitry 204 to provide outputs of motion detection component 206 to the electronic device (e.g., unless the user activates communications circuitry 204 or motion detection component 206, wand 200 may ignore movements of wand 200 and not provide motion information to the electronic device). This may allow the electronic device to ignore accidental movements of the wand and avoid adversely affecting the user's viewing experience. The motion enabling mechanism may include any suitable input mechanism, including for example an optical or capacitive sensor operative to detect the position of a user's hand or finger on input mechanism 208. For example, in response to determining that a user's finger is placed on an optical or capacitive sensor (e.g., the user's thumb is on the top of wand 200, or the user's hand is on the body of wand 200), wand 200 may enable communications circuitry 204 or motion detection component 206.

In some embodiments, input mechanism 208 may include thumbprint or fingerprint sensing components, or any other suitable biometric sensing components, to identify the user currently using wand 200. For example, a thumb or finger printing sensor may be embedded within the motion enabling mechanism or a the z-direction mechanism. In response to detecting a thumbprint or fingerprint, wand 200 or the electronic device may compare the detected print with a library of known prints to authenticate or log-in the user associated with the print. In response to identifying the user, the electronic device may load content specific to the identified user (e.g., a user profile, or access to the user's recordings), or provide the user with access to restricted content (e.g., content restricted by parental control options). If wand 200 or the electronic device does not recognize the thumb or finger print, the electronic device may load a default or guest profile or may prevent the user from accessing the Electronic device.

In some embodiments, wand 200 may include an optical component for receiving and processing infrared light received from one or more IR modules. In some embodiments, the optical component may include an infrared filter, a lens, an image pickup element and image processing circuitry (not shown). The infrared filter may be operative to prevent all light waves other than IR light from reaching the lens, which may be positioned directly behind the infrared filter. The lens may be operative to pick up the light that passed through the infrared filter and may provide the light to the image pickup element. The image pickup element may be operative to take an image of the light received from the lens, and may provide the image data to the image processing circuitry. In some embodiments, the image pickup element may include a solidstate imaging device such as, for example, a CMOS (complimentary metal-oxide semiconductor) sensor or a CCD (charge-coupled device). The image processing circuitry may be operative to process the image data received from the image pickup element to identify bright spots corresponding to the IR modules, and provide position information, orientation information, or both to communications circuitry 204.

Figure 3:
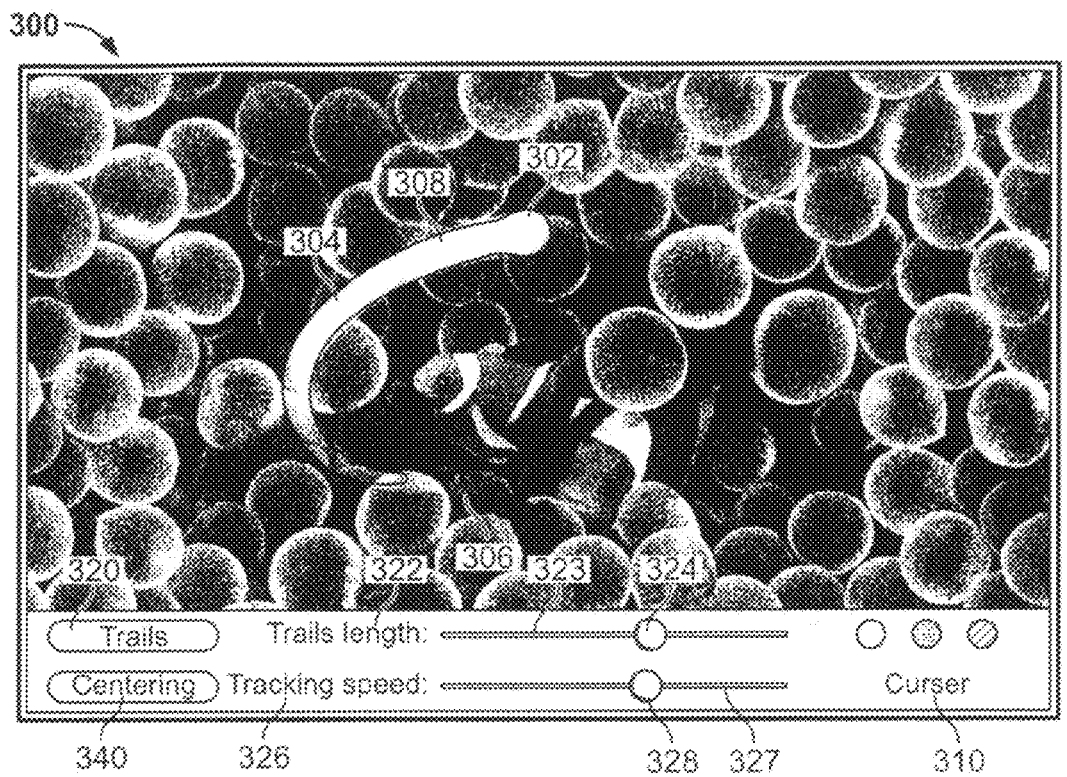
FIG. 3 is a schematic view of an illustrative display for setting up a cursor in accordance with one embodiment of the invention.

As described above, the electronic device may display any suitable interface that can be controlled by wand 200. In some embodiments, the electronic device may display a cursor that the user may control by moving wand 200. For example, the cursor may include a light region (e.g., a circular light region) that the user may control by moving wand 200. As the user moves wand 200, motion detection component 206 may detect the wand movement and provide information identifying the particular movement to the electronic device. Using this information, the electronic device may update the position of the cursor on the display. FIG. 3 is a schematic view of an illustrative display for setting up a cursor in accordance with one embodiment of the invention. Display 300 may include cursor 302, which the user may control by moving a wand (e.g., wand 200, FIG. 2). The electronic device may indicate the prior movement and current direction of movement of cursor 302 using trail 304. Trail 304 may progressively fade to indicate the most recent position of cursor 302. For example, trail 304 may indicate that cursor 302 moved from initial, faded position 306 towards current, intensified position 308. When cursor 302 remains immobile for a particular amount of time (e.g., defined by the trail tracking speed), trail 304 may dissipate and only cursor 302 may be visible.

The electronic device may display any suitable type of cursor. In some embodiments, display 300 may include cursors options 310 for selecting the type of cursor to display. For example, cursor options 310 may include options for selecting a circle, a white disk, or a grey disk. Other suitable types of cursors may be displayed, including for example an arrow, a hand, a bar, an icon, or any other suitable cursor. In some embodiments, the electronic device may provide the user with an option to set the size of the cursor (e.g., the diameter of the circle). For example, the electronic device may display a bar with an indicator that the user may displace along the bar to define the current size of the cursor.

The electronic device may display cursor 302 at any suitable time. For example, the electronic device may always display cursor 302. As another example, the electronic device may display cursor 302 in response to detecting movement of the wand (e.g., in response to receiving an output from motion detection component 206, FIG. 2), or to receiving an input from the wand (e.g., from input mechanism 208, FIG. 2). The electronic device may subsequently hide cursor 302 after a particular delay (e.g., hide cursor 302 after detecting no further movement during a 30 second period). As another example, the electronic device may display cursor 302 based on the currently displayed context (e.g. based on the electronic device content).

In some embodiments, the electronic device may display cursor 302 in response to detecting a user's hand on the wand. For example, an optical or capacitive sensor on the wand may be operative to detect when a user's finger is placed over an input mechanism or over the body of the wand. As another example, a fingerprint sensor may be operative to detect and identify the particular user holding the wand. In response to detecting the user's hand, or in response to determining that a user identified by a fingerprint sensor is authorized to access the electronic device, the electronic device may display cursor 302. The electronic device may continue to display cursor 302 as long as the user's hand is detected on the wand, or as long as a motion detection component or input mechanism of the wand provides user instructions to the electronic device. In some embodiments, the electronic device may hide cursor 302 after a particular delay lapses (e.g., 30 seconds after the user's hand is no longer detected, or after no outputs or inputs are received from the wand.

The user may define attributes of trail 304 using any suitable approach. In some embodiments, the electronic device may display trails option 320. In response to receiving a user selection of trails option 320, the electronic device may display trails length option 322 and tracking speed option 326. Trails length option 322 may be associated with bar 323 on which indicator 324 may slide. As indicator 324 slides along bar 323, the length of trail 304 may be adjusted. For example, if indicator 324 is placed on the left end of bar 323, trail 304 may be shorter. Conversely, if indicator 324 is placed on the right end of bar 323, trail 304 may be longer. The user may displace indicator 324 along bar 323 using any suitable approach, including for example the user selecting indicator 324 using cursor 302 and dragging indicator 324 along bar 323.

Similar to trails length option 322, tracking speed option 326 may be associated with bar 327 on which indicator 328 may slide. As indicator 328 slides along bar 327, the speed at which trail 304 dissipates may be adjusted. For example, if indicator 328 is placed on the left end of bar 327, trail 304 may dissipate slower. Conversely, if indicator 328 is placed on the right end of bar 327, trail 304 may dissipate faster. The user may displace indicator 328 along bar 327 using any suitable approach, including for example the user selecting indicator 328 using cursor 302 and dragging indicator 328 along bar 327.

To assist the user in manipulating cursor 302, the electronic device may provide an option for centering cursor 302. For example, if the user initially was using the wand while sitting down, and subsequently wishes to lie down or stand up and continue to use the wand, the change in the user's position may cause the wand to move in an unexpected or undesired manner. To allow the user to reset the position of the cursor once the user is in his new position, the user may select centering option 340. For example, the user may navigate cursor 302 to centering option 340 and select the option (e.g., by providing an input on the input mechanism, or moving the wand in a particular manner for the motion detection component to provide a particular output associated with selecting an option). In response to receiving the selection of centering option 340, the electronic device may automatically navigate cursor 302 to the center of display 300. Subsequent movements of the wand detected by the motion detection component may then cause cursor 302 to be displaced from the center position of display 300.

Other approaches may be used to center cursor 302. In some embodiments, the user may provide a particular input on the input mechanism of the wand. For example, the user may press a home button or key, or swipe or tap a finger across the input mechanism in a particular manner (e.g., double tap a touch screen, swipe a finger in a circle on the touch screen, or lift a finger off the input mechanism for a particular amount of time before returning the finger to the input mechanism). In some embodiments, the user may move the wand in a particular manner to direct the electronic device to center cursor 302. For example, the user may shake the remote a predetermined number of times, or swing the remote so that the cursor moves across the screen a predetermined number of times, or move the remote such that the cursor traces a particular pattern (e.g., the user moves the wand so that the cursor moves back and forth across the screen three times). Once the cursor is centered, the electronic device may detect the motion of the wand from the new position of the wand once the cursor was centered instead of the prior wand position prior to centering (e.g., instead of detecting motion from the wand pointed towards the screen, the electronic device detects motion from the wand pointed towards the ground).

In some embodiments, the user may accidentally or unintentionally move his hand or let his hand drift as he is holding the wand, causing the cursor to move in an inadvertent manner. The electronic may detect such drifting motion using any suitable approach. For example, the electronic device may determine that the user's hand is drifting when the cursor moves along an edge of the display (e.g., the user's hand unintentionally pivots the wand, causing the cursor to move up along the left or right edge of the display). As another example, the electronic device may detect the change in orientation of the wand using a magnetometer and determine that the rate of change is indicative of hand drift (e.g., the rate of movement is so low that the electronic device determines the user could not be trying to move the cursor, or the rate of movement is so high that the electronic device determines that the wand may have fallen or been dropped).

The electronic device may provide any suitable response to detecting hand drift. For example, the electronic device may automatically center the cursor. As another example, the electronic device may display a centering option for the user to re-center the cursor. As still another example, the electronic device may ignore movements of the wand and stop moving the cursor until the electronic device determines that the user's hand is no longer drifting (e.g., the wand moved in a definite manner, or the user provided an input using an input mechanism). In some embodiments, the electronic device may assist the user in re-centering the cursor by requiring the user to physically move the wand a greater distance in the direction opposite the detected hand drift such that the relative wand position when the cursor is centered (e.g., relative the user's position) is the same as the relative position when the cursor is centered prior to the hand drift (e.g., instead of off-set by the amount of hand drift).

Figure 4:
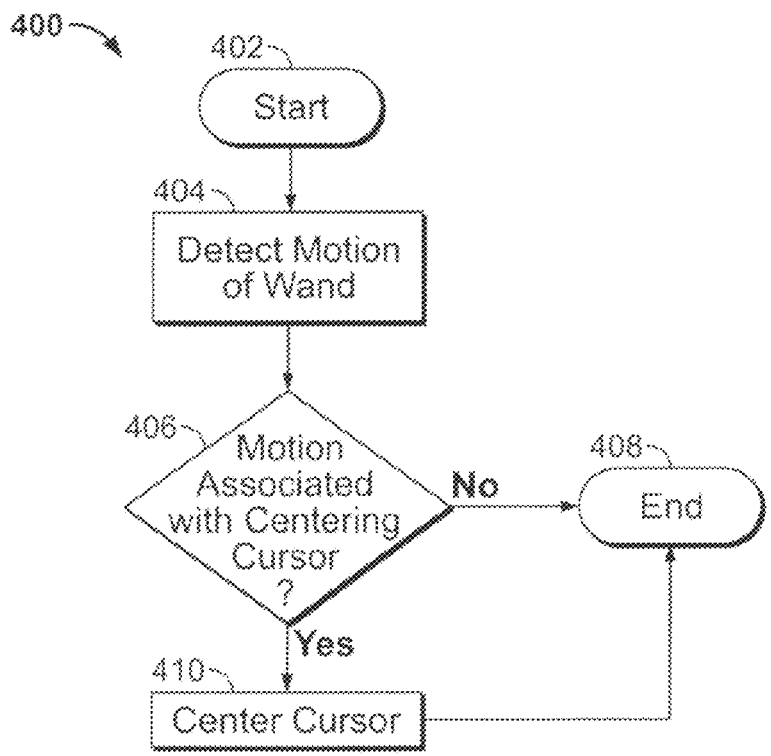
FIG. 4 is a flowchart of an illustrative process for centering a cursor displayed by an electronic device in accordance with one embodiment of the invention.

FIG. 4 is a flowchart of an illustrative process for centering a cursor displayed by an electronic device in accordance with one embodiment of the invention. Process 400 may begin at step 402. At step 404, the electronic device may detect motion of a wand associated with the electronic device. For example, the electronic device may receive a communication from communications circuitry of a wand (e.g., communications circuitry 204 of wand 200, FIG. 2) that identifies the motion of the wand. At step 406, the electronic device may determine whether the detected motion is associated with centering the cursor. For example, the electronic device may determine whether the detected motion matches an existing motion from a library of motions that is associated with centering a displayed cursor. Such motions may include, for example, shaking the wand a predetermined number of times, moving the wand in a particular pattern, or swinging the wand a particular number of times. As another example, the electronic device may determine whether the motion of the wand is associated with the user's hand drifting.

If, at step 406, the electronic device determines that the detected motion is not associated with centering the cursor, process 400 may move to step 408 and end. If, at step 406, the electronic device instead determines that the detected motion is associated with centering the cursor, process 400 may move to step 410. At step 410, the electronic device may center the cursor. For example, the electronic device may ignore subsequent motions of the wand and move the cursor to the center of the display. Process 400 may then move to step 408 and end.

When one or more objects are simultaneously displayed by the electronic device, such as for example listings or images, the user may zoom the display of the displayed objects using any suitable approach. In some embodiments, the user may approach or withdraw the wand from the screen or the electronic device to zoom in and out a display. In some embodiments, the user may instead or in addition provide an input using an z-direction input mechanism. For example, the user may slide a finger forward and back on a touchpad to zoom in and out. As another example, the user may roll a scroll wheel embedded in the wand. As still another example, the user may pinch several fingers together and spread out the fingers on a touch screen or touchpad. FIGS. 5A-D are illustrative displays of objects as the user zooms in accordance with one embodiment of the invention. Display 500 of FIG. 5A may include several objects displayed for the user. For example, display 500 may include several icons, listings or images that the user may select to view (e.g., 24 icons representing media that may be played back in response to a user selection).

The user may select a particular icon around which to zoom using any suitable approach. In some embodiments, the user may place a cursor over icon 502 and provide a selection input. For example, the user may place a cursor over icon 502 and provide an input using an input mechanism of the wand (e.g., a button from input mechanism 208, FIG. 2), or move the wand in a particular manner to provide a selection instruction (e.g., twist the wand). The electronic device may indicate that icon 502 has been selected using any suitable approach, including for example changing the size of icon 502 relative other displayed icons, displaying title 504.

In response to receiving an instruction to zoom, the electronic device may display a new screen with larger objects. The electronic device may reduce the number of objects displayed and resize the objects that are displayed such that the displayed objects in the new screen are larger than the objects displayed in the previous screen. Display 510 of FIG. 5B may include fewer icons than previously displayed in display 500 of FIG. 5A. For example, display 510 may include one fewer row of icons, and two fewer columns of icons (e.g., displaying 15 icons). The icons displayed in display 510 may be larger (e.g., zoomed in) than the icons displayed in display 500.

Figure 5A:
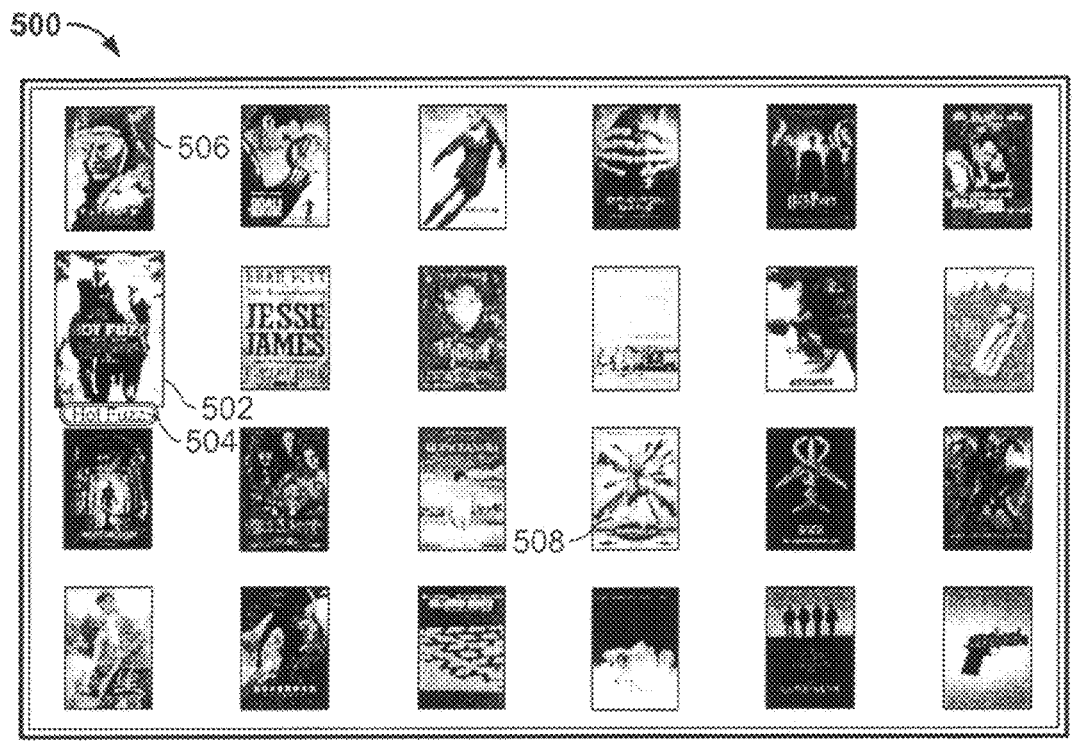
FIGS. 5A-D are illustrative displays of objects as the user zooms in accordance with one embodiment of the invention.
Figure 5B:
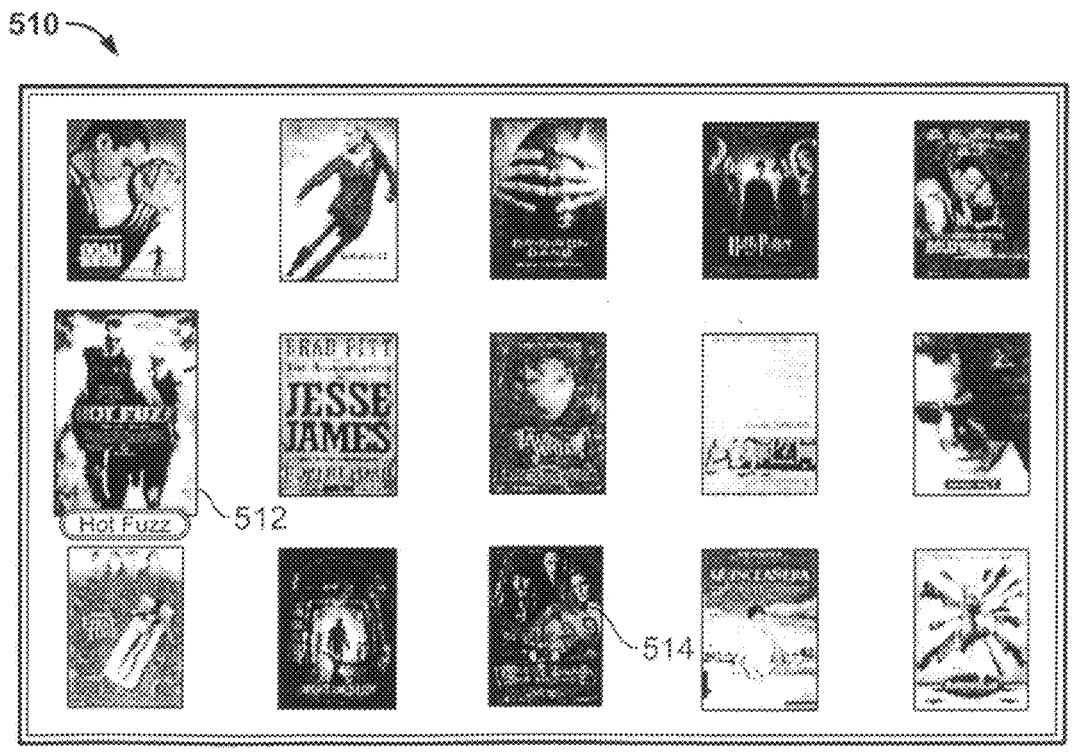
Figure 5C:
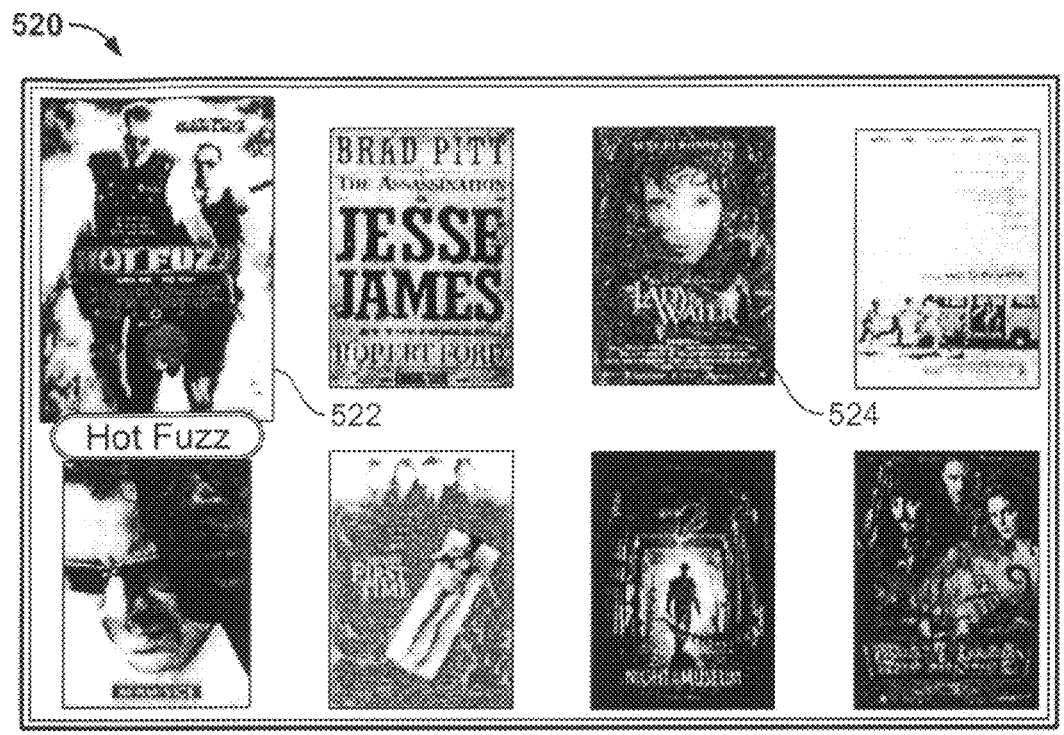
Figure 5D:
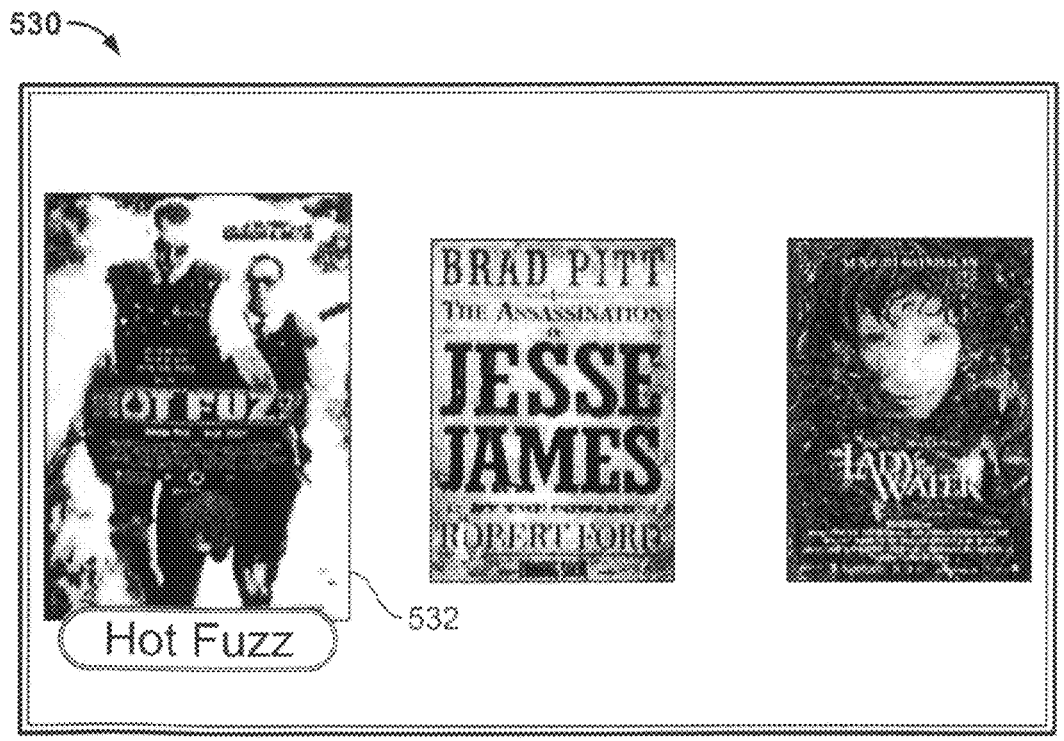

The electronic device may determine which objects to display in a zoomed display using any suitable approach. For example, the electronic device may dynamically re-arrange the displayed objects as the user zooms. In some embodiments, the electronic device may zoom the display such that the objects displayed in the center of the display remain visible as the display is zoomed in. In some embodiments, if the user has selected a particular object (e.g., icon 502), the electronic device may zoom the display such that the selected object remains visible in the zoomed display. Further, the electronic device may maintain the selected object in generally the same portion of the display as the display is zoomed. In the example of FIGS. 5A and 5B, as display 500 is zoomed to display 510, icon 502 becomes icon 512 and remains on the left side of the display. To maintain the ordering of icons from display 500 to display 510, icon 506 from display 500, which is the first icon displayed in the listing, may be removed from display 510. In addition, the icons following icon 508 in display 500, which are ordered after icon 502, may be removed from display 510. The electronic device may use any suitable algorithm for determining which icons to remove, including for example determining how many icons to display in the new display, and distributing the number of icons to display before and after the selected icon based on the position of the selected icon in the initial display.

In response to an instruction from the user to further zoom the displayed objects, the electronic device may further reduce the number of displayed rows by one, and the number of displayed columns by one (e.g., displaying 8 icons). The electronic device may select which objects to remove from the display using any suitable approach discussed above. For example, display 520 of FIG. 5C may include icon 522, which may correspond to icon 512 of display 510. Furthermore, display 520 may not include any of the icons previously displayed before icon 512 of display 510, and any icon following icon 514 of display 510 so as to maintain the ordering of the icons. In response to an additional instruction to zoom, the electronic device may still further reduce the number of displayed rows by one, and the number of displayed columns by one (e.g., displaying three icons). The electronic device may select which objects to remove from the display using any suitable approach discussed above. For example, display 530 of FIG. 5D may include icon 532, which may correspond to icon 522 of display 520. Furthermore, display 530 may not include any icon following icon 524 of display 520 so as to maintain the ordering of the icons.

Figure 6:
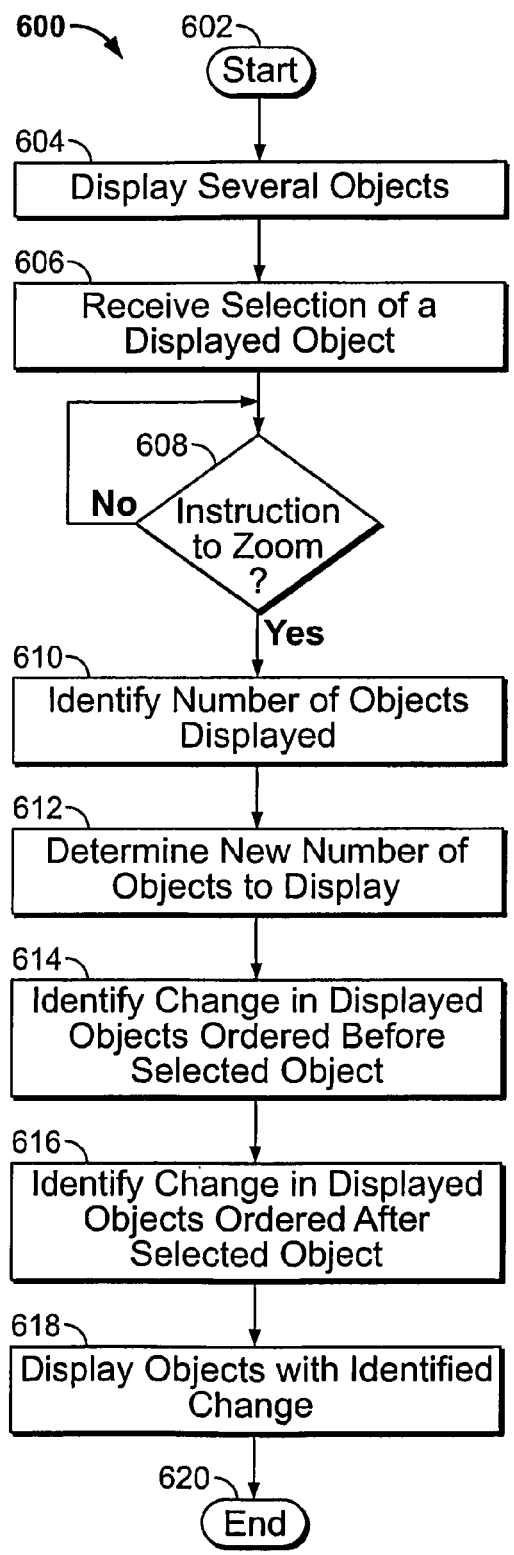
FIG. 6 is a flowchart of an illustrative process for changing the display of several objects in response to receiving a request to zoom in accordance with one embodiment of the invention.

FIG. 6 is a flowchart of an illustrative process for changing the display of several objects in response to receiving a request to zoom in accordance with one embodiment of the invention. Process 600 may begin at step 602. At step 604, the electronic device may display several objects. For example, the electronic device may display several selectable icons for different media (e.g., icons of videos). As another example, the electronic device may display listings for media (e.g., a playlist for music). The objects may be displayed in any suitable order, including for example in a particular order (e.g., alphabetically). At step 606, the electronic device may receive a user selection of a particular object. For example, the user may direct a cursor to a particular object using a wand associated with the electronic device, and may provide a selection instruction. At step 608, the electronic device may determine whether an instruction to zoom the displayed objects has been received. For example, the electronic device may determine whether a zoom instruction has been provided using an input mechanism of the wand (e.g., using a z-direction mechanism). As another example, the electronic device may determine whether the distance between the wand and the display has changed. If the electronic device determines that no instruction to zoom has been received, process 600 may return to step 608 and continue to monitor inputs received from the wand.

If, at step 608, the electronic device instead determines that a zoom instruction has been received, process 600 may move to step 610. At step 610, the electronic device may identify the number of objects displayed prior to receiving the zoom instruction. For example, the electronic device may determine how many selectable objects are displayed by the electronic device. At step 612, the electronic device may determine the new number of objects to display in response to the zoom instruction. For example, the electronic device may determine, based on whether the instruction was to zoom in or zoom out, and based on the amount to zoom, how many objects to display.

At step 614, the electronic device may determine the change in displayed objects that are ordered before the selected object in the initial object display. For example, if the zoom instruction was to zoom in, the electronic device may determine how many objects initially ordered before the selected object to remove from the new object display. As another example, if the zoom instruction was to zoom out, the electronic device may determine how many objects initially ordered before the selected object to add to the new object display. The electronic device may determine how to change the displayed objects using any suitable approach, including for example selecting how to change the displayed objects in a manner that maintains the general position of the selected object in the display. At step 616, the electronic device may determine the change in displayed objects that are ordered after the selected object in the initial object display. For example, if the zoom instruction was to zoom in, the electronic device may determine how many objects initially ordered after the selected object to remove from the new object display. As another example, if the zoom instruction was to zoom out, the electronic device may determine how many objects initially ordered after the selected object to add to the new object display. The electronic device may determine how to change the displayed objects using any suitable approach, including for example selecting how to change the displayed objects in a manner that maintains the general position of the selected object in the display. At step 618, the electronic device may display the objects with the changes identified at steps 614 and 616. For example, the electronic device may display a zoomed-in or zoomed-out display of objects that includes fewer or more objects, as determined by steps 614 and 616. Process 600 may then end at step 620.

In some embodiments, the user may change the order of several objects displayed by the electronic device. For example, returning to display 500 of FIG. 5A, the user may change the order of displayed icons 502 using any suitable approach. For example, the user may select a particular icon by placing a cursor over the icon, selecting the icon and dragging the cursor to a new position on the display. In response to receiving the user instruction to drag a selected icon, the electronic device may move the selected icon to follow the movement of the cursor while displacing the remaining, unselected icons of the display (e.g., creating a new position for the icon in the display). Once the user has identified a new position for the icon, the user may provide an instruction to release the selected icon to place the icon in its new position.

When fewer than all of the available objects are simultaneously displayed (e.g., once the user has begun to zoom in a display of several images, as shown in FIGS. 5A-D), the user may scroll the display of the objects. For example, from display 520, the user may scroll up or down to change the displayed icons (e.g., to include icons ordered before or after the first and last icons of display 520). The user may provide an instruction to scroll objects using any suitable approach. In some embodiments, the user may move the wand in a particular direction (e.g., towards an edge of the display) to scroll in the direction in which the wand is pointed. The speed at which the wand is moved, and the particular position on the screen may be used to determine the speed at which to scroll, and the amount to scroll.

In some embodiments, the user may provide an instruction to scroll by providing an input using an input mechanism of the wand. For example, the input mechanism may include a touch screen or touchpad with which the wand may track movements of the user's finger. As the user moves his finger in a particular direction, the electronic device may scroll the displayed objects in the tracked direction. If there are a limited number of directions in which the objects may be scrolled, the electronic device may extrapolate, from the general direction of the tracked movement of the user's finger, the direction in which to scroll the displayed objects (e.g., if the tracked movement detects movement from the bottom of the wand towards the top of the wand, scroll up the displayed objects).

The electronic device may scroll the displayed objects at any suitable speed. In some embodiments, the scrolling speed may be related to the speed at which the user's finger moves across the input mechanism. For example, if the user moves his finger rapidly, the electronic device may scroll rapidly, and conversely, if the user moves his finger slowly, the electronic device may scroll slowly. The electronic device may stop scrolling a display at any suitable time. For example, the electronic device may stop scrolling as soon as the user lifts his finger from the input mechanism. As another example, if the user flicks the input mechanism to scroll the displayed objects, the electronic device may progressively slow the scrolled objects before coming to a stop. In addition or instead of progressively slowing down, the electronic device may stop the scrolling of objects in response to determining that the user has tapped to input mechanism or placed his finger on the input mechanism.

In some embodiments, the electronic device may perform different scrolling operations based on the direction of motion tracked by the wand. For example, the electronic device may perform a different scrolling function based on the particular axis in which the wand detected motion of a user's finger. The electronic device may be operative to detect motion in any suitable number of axes to provide different types of scrolling associated with each axis. The type of scrolling implemented in response to the detected motion may depend on the particular objects or menu displayed by the electronic device. For example, the electronic device may display a menu having several categories of objects. In response to a user selection of a particular category, listings of objects related to the selected category may be displayed. When the wand detects motion of a user's finger on an input mechanism in a first axis (e.g., up/down motion), the electronic device may scroll through the displayed objects associated with the selected category. When the wand instead detects motion of a user's finger in a second axis (e.g., left/right motion), the electronic device may scroll through the available categories (e.g. and replace the displayed objects).

As another example, the electronic device may initiate coarse scrolling of objects in response to detecting motion along a first axis (e.g., left/right motion), and fine scrolling of objects in response to detecting motion along a second axis (e.g., up/down motion). As another example, the device may initiate scrolling in response to motion along a first axis, and paging or jumping to chapter markers in response to motion along a second axis. If the wand detects motion in both axes simultaneously, the electronic device may simultaneously scroll both the displayed objects and categories in an amount related to the amount of motion in each axis, or may instead identify the axis in which more motion was provided, and disregard the other axis. In some embodiments, one or more scrolling modes may include displaying a selectable listing of tabs that the user may select to jump to a particular section in the displayed objects. For example, the electronic device may display an alphabet, chapter numbers, or numbers (e.g., decades) that the user may select to jump to a particular object (e.g., display a vertical alphabet along the side of the display).

In some embodiments, the user may control the playback of media my providing different inputs along different axes of the same input mechanism. For example, inputs provided in a first axis (e.g., up/down) may direct the electronic device to fast-forward or rewind the currently played back media item. Inputs provided in a second axis (e.g., left/right) may direct the electronic device to skip to the previous or next media item in the list (e.g., in the playlist or album). In some embodiments, the user may simultaneously provide an input along a particular axis along with a second input (e.g., hold one finger substantially immobile on the touch screen or touchpad while swiping another finger, or pressing a button while swiping another finger) to control another media playback feature or operation (e.g., volume).

Figure 7:
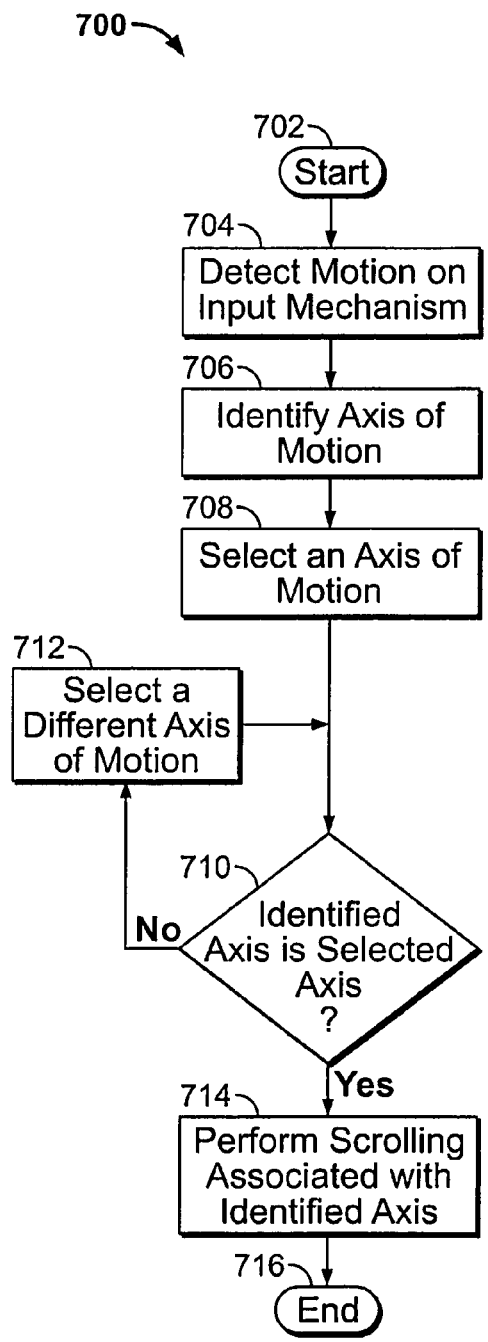
FIG. 7 is a flowchart of an illustrative process for scrolling objects using a wand coupled to an electronic device in accordance with one embodiment of the invention.

FIG. 7 is a flowchart of an illustrative process for scrolling objects using a wand coupled to an electronic device in accordance with one embodiment of the invention. Process 700 may begin at step 702. At step 704, the electronic device may detect motion on an input mechanism of the wand. For example, the wand may detect motion of a user's finger across input mechanism 208 of wand 200 (FIG. 2) and provide an indication of the motion to the electronic device. At step 706, the electronic device may identify the axis of the detected motion. For example, the electronic device may compare the direction of the motion detected at step 704 with one or more known axes of motion associated with the input mechanism. The input mechanism may have any suitable known axes of motion, including for example up/down and left/right. In some embodiments, the electronic device may identify several axes associated with the detected motion. If several axes are detected, the electronic device may identify the one or more of the more prominent axes and ignore the remaining axes, or may instead or in addition determine of the position of detected motion associated with each of the identified several axes.

At step 708, the electronic device may select a particular axis of motion associated with the input mechanism. For example, the electronic device may identify a library of axes associated with the input mechanism, and select a first axis from the library. At step 710, the electronic device may determine whether the axis identified at step 706 is the same as the axis selected at step 708. If the electronic device identified several axes at step 706, the electronic device may determine whether the axis selected at step 708 is the same as at least one of the identified axes. If the electronic device determines that the identified axis is not the same as the selected axis, process 700 may move to step 712. At step 712, the electronic device may select another axis of motion associated with the input mechanism. For example, the electronic device may select the next axis in the library of axes associated with the input mechanism. Process 700 may then return to step 710 and compare the newly selected axis with the axis identified at step 706.

If, at step 710, the electronic device instead determines that the identified axis is the same as the selected axis, process 700 may move to step 714. At step 714, the electronic device may scroll the displayed objects using the scrolling function associated with the selected axis. For example, the electronic device may initiate fine scrolling, coarse scrolling paging, jumping to chapter markers in response to determining the scrolling function associated with the selected axis. If several axes of motion were identified at step 706, process 700 may move to step 712 to select another axis of motion associated with the input mechanism. If only one axis was identified, or if the scrolling function associated with all of the identified axes have been identified, process 700 may then end at step 716.

Figure 8:
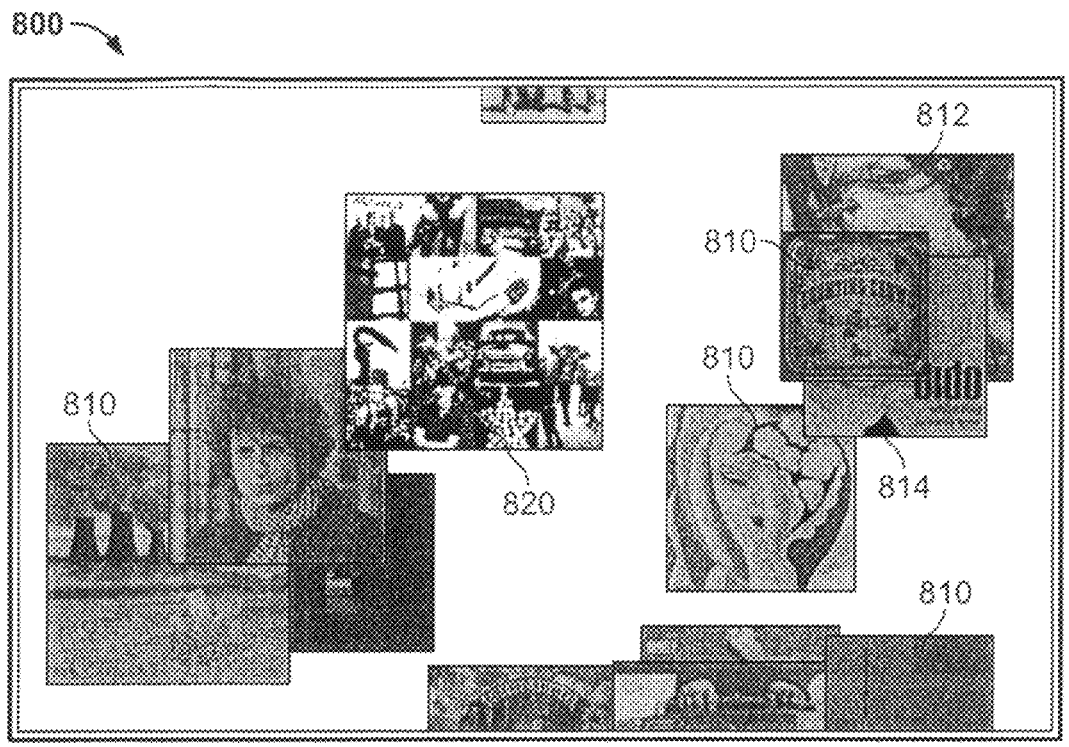
FIG. 8 is a schematic view of an illustrative screen saver in accordance with one embodiment of the invention.

When the user of the electronic device ceases providing input over a particular amount of time, the electronic device may enable a screen saver mode. In some embodiments, the screen saver mode may be interactive without causing the electronic device to exit the screen saver mode and activate other electronic device processes. The electronic device may include any suitable screen saver. For example, the screen saver may include selectable icons representing different media objects. FIG. 8 is a schematic view of an illustrative screen saver in accordance with one embodiment of the invention. Display 800 may include several images 810 representing different media objects or media items displayed on a blank or background screen (e.g., on a wallpaper or colored background). For example, images 810 may include album art associated with different musical pieces available to the electronic device. The electronic device may select which images 810 to display using any suitable approach. In some embodiments, the electronic device may first determine a subset of media items for which to display images as part of the screen saver. The electronic device may select the subset based on any suitable criteria. In some embodiments, the electronic device may select, automatically or in response to a user instruction, a subset of media items accessible to the electronic device from a library (e.g., a remotely or locally stored music library accessed using iTunes). For example, the user may select particular media items to use in a screen saver (e.g., a screen saver music playlist). As another example, the electronic device may automatically pick the user's highest rated media items, favorite media items, recommended media items, recently acquired media items (e.g., recently purchased using iTunes), recently listened to media items, not recently listened to media items, the media items for which an image is available, or any other subset of media items. In some embodiments, the electronic device may select all of the media items available to the user, or may limit the number of media items selected for the screen saver (e.g., to allow the user to view all of the images displayed as part of the screen saver).

Once the electronic device has selected the subset of media items, the electronic device may identify images associated with each selected media item. The electronic device may identify the images using any suitable approach. For example, the electronic device may identify images associated with selected media items in a media application library (e.g., an iTunes library). If no particular image is associated with a selected media item, the electronic device may select a default image (e.g., an icon), prompt the user to select an image, or deselect the media item. In some embodiments, several media items may be associated with a particular image. For example, several tracks of a same album, or by a same artist may be associated with an image representing the album or the artist.

The electronic device may display images 810 using any suitable approach. In some embodiments, the electronic device may display images 810 in different sizes and in different areas of the display. Some images 810 may be overlaid over other images 810. The electronic device may animate one or more of images 810 to dynamically change the images 810 displayed at a particular time. For example, the electronic device may move or float images 810 in a vertical direction (e.g., up or down), in a horizontal direction (e.g., left and right), or in an arbitrary direction (e.g., an angled orientation). The electronic device may move each image 810 at a particular speed, which may differ for each image (e.g., some images move rapidly, and others more slowly). The electronic device may use any suitable approach for displaying images that reach a border of the display. For example, the electronic device may treat the border as a hard edge off which images 810 may bounce or deflect. As another example, the electronic device may allow images 810 to disappear past the edge of display 800, and later re-appear at the same or another edge of the display (e.g., disappear at the top, and re-appear at the bottom). The position on the display at which an image may re-appear may or may not correspond to the position on the display at which the image disappeared (e.g., the image may re-appear along the same line or axis as the image initially disappeared).

To provide an illusion of depth, the electronic device may assign images to different, overlaid tracks. For example, the electronic device may display a first image 812 in a rear track, and a second image 814 in a forward track such that, as images 812 and 814 move, image 814 may be displayed on top of image 812. The electronic device may display any suitable number of tracks, including for example one track for each displayed image, or a reduced number of tracks (e.g., 1 to 10 tracks). In some embodiments, the user may select how many tracks to use for displaying images 810.

In some embodiments, the user may enable a flashlight mode to view a particular image 810. For example, in response to receiving a particular user input from an input mechanism of the wand (e.g., the user placing a finger on a button of the wand, or swiping a finger on an input mechanism in a particular manner), the electronic device may illuminate a section of the screen that is adjacent to the position of the cursor (e.g., surrounding the cursor). The electronic device may change the illumination of the displayed images as the user moves the wand and the illuminated portion of the screen changes to follow the movement of the cursor.

The user may select a particular image 810 while remaining in the screen saver mode using any suitable approach. For example, the user may move a cursor over a particular image (e.g., by moving a wand coupled to the electronic device to control the placement of the cursor) to select an image. In some embodiments, the user may in addition provide a selection input (e.g., provide an input using an input mechanism, or move the wand in a particular manner). In response to receiving a user selection of a particular image, the electronic device may indicate that the particular image has been selected using any suitable approach. In some embodiments, the electronic device may indicate that an image has been selected by pausing the movement of the selected image. For example, in response to receiving a user selection of image 820, the electronic device may stop the movement of image 820 while continuing to move the remaining images 810 displayed by the screen saver. In some embodiments, the electronic device may bring the selected image to the front of the display, change the illumination of the image (e.g., as if the illuminated portion of the flashlight mode were on the selected image), change the size of the image, or modify the image in any other suitable manner to differentiate the selected image from the remaining images. For example, image 820 may be illuminated (e.g., as if a flashlight is pointed at image 820). As another example, image 820 may be displayed in front of the other images 810 displayed as part of the screen saver.

Figure 9:
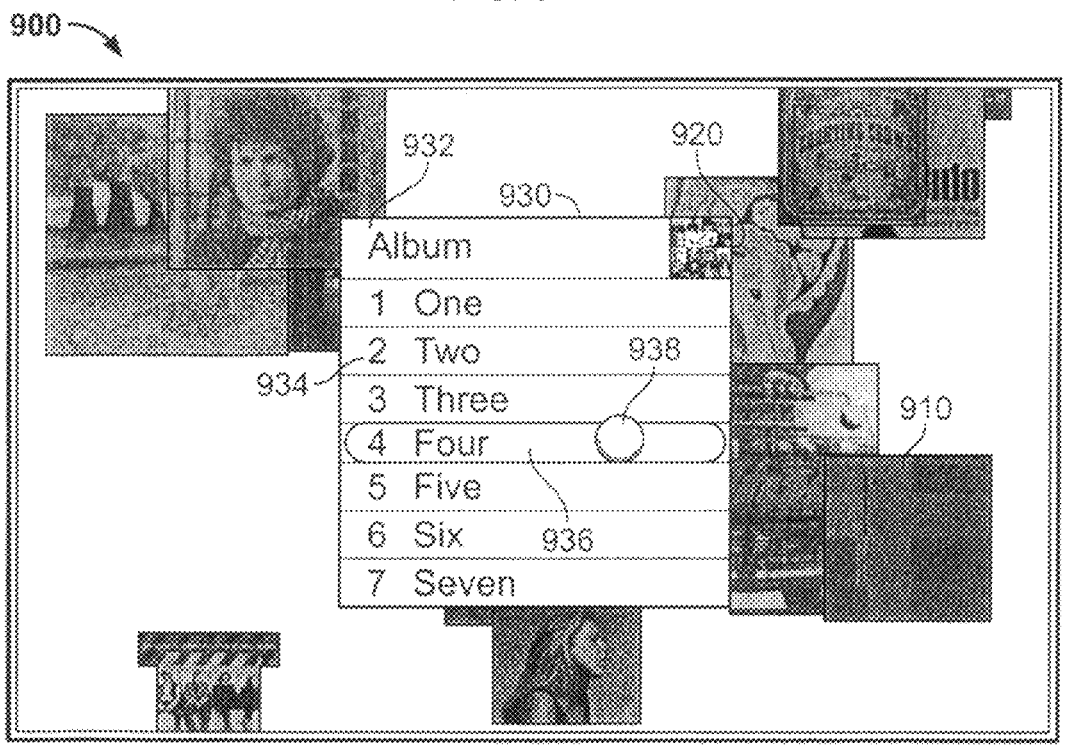
FIG. 9 is a schematic view of an illustrative display screen of listings for a selected image of a screen saver in accordance with one embodiment of the invention.

The user may access a listing of media items associated with a selected image using any suitable approach. In some embodiments, after selecting an image (e.g., image 820), for example by placing a cursor over the image, the user may provide an input (e.g., using an input mechanism) to view media item listings for the selected image. FIG. 9 is a schematic view of an illustrative display screen of listings for a selected image of a screen saver in accordance with one embodiment of the invention. Display 900 may include several images 910, which may continue to move while a particular image has been selected. For example, images 910 may be displaced with respect to images 810 of FIG. 8 (e.g., images 910 have moved up relative to images 810).

In response to receiving the user instruction to display media item listings, the electronic device may display listings display 930. For example, the electronic device may replace the display of the selected image (e.g., image 820, FIG. 8)

with listings display 930. The electronic device may display listings display 930 using any suitable approach. For example, the electronic device may display a pop-up window having several listings (e.g., a pop-up window in the center of the screen). As another example, the electronic device may display a new display window having listings. As still another example, the electronic device may display a media application display that includes listings for media items.

Display 930 may include any suitable information for identifying media items associated with the selected image. For example, display 930 may include image 920, which may be a reduced-size representation of the selected image (e.g., image 820). Display 930 may include title 932 and listings 934 of media items associated with title 932. For example, title 932 may be the title of an album, compilation or playlist, and listings 934 may include information identifying music in the album, compilation or playlist (e.g., artist and song names). The user may select a particular listing by placing highlight region 936 over the listing using cursor 938, and providing a selection instruction. Display 930 may include any suitable number of listings 934. For example, display 930 may include up to a limited number of listings (e.g., up to 10 listings). If more media items than the limited number are associated with the selected image, the electronic device may allow the user to scroll listings 934. For example, the user may scroll listings 934 by providing an input using an input mechanism of the wand (e.g., swiping a finger across a touch screen or touchpad embedded in the wand). As another example, the user may move cursor 938 to the edges of display 930 to scroll listings 934 (e.g., move cursor 938 to the upper edge of display 930 to scroll up, or move cursor 938 to the lower edge of display 930 to scroll down). To assist the user in scrolling display 930, the electronic device may prevent cursor 938 from being moved beyond the boundaries of display 930 (e.g., prevent the user from placing cursor 938 on the top edge of display 900 in an attempt to scroll listings 934). To select a different image, the user may first direct the electronic device to hide display 930 (e.g., and display selected image 920 with images 910).

In some embodiments, the user may select title 932 by placing highlight region 936 over title 932. In response to receiving a user selection of title 932, the electronic device may provide the user with other media items or groupings of media items (e.g., albums, playlists or compilations) related to the selected title 932. For example, the electronic device may identify related media items using a media application implemented on the electronic device. The electronic device may use any suitable criteria to identify other media items to display in response to receiving a selection of title 932. For example, the electronic device may identify media items that share an attribute (e.g., genre, artist, or ranking) with one or more media items associated with the selected title (e.g., media items of listings 934). As another example, the electronic device may identify media items identified as being of interest to the user based on the user's preferences (e.g., as determined by monitoring the user's interactions, or by receiving an indication of preferences from the user).

In response to a user selection of a particular listing (e.g., in response to receiving a user input selecting a highlighted listing), the electronic device may play back the media item of the selected listing, for example without interrupting or disabling the screen saver. For example, the electronic device may retrieve from memory the selected media item, and direct an audio output mechanism to provide an audio output for the media item. As another example, the electronic device may display a video clip or video associated with the selected listing on display 900. The displayed media may move (e.g., with images 910) or may remain immobile in any suitable section of the screen). Once the user has a selected a particular media item, the electronic device may hide display 930, and continue to display images 910 (including, for example, the previously selected image 920). Alternatively, the electronic device may maintain display 930 until a user instruction to hide display 930 is received (e.g., a user instruction to hide display 930, or receiving a user selection from an input mechanism while the cursor is outside of display 930), or until a particular amount of time lapses (e.g., 1 minute lapses).

Figure 10:
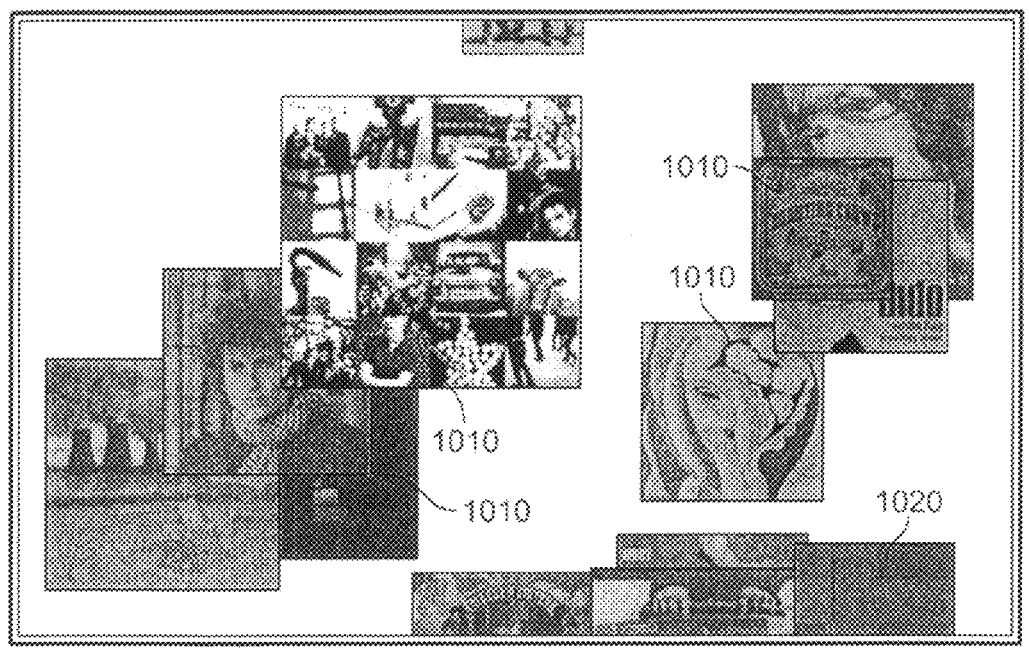
FIG. 10 is a schematic view of an illustrative display screen for selecting an off-screen image of a screen saver in accordance with one embodiment of the invention.

In some embodiments, the user may select an image that is partially off the display. FIG. 10 is a schematic view of an illustrative display screen for selecting an off-screen image of a screen saver in accordance with one embodiment of the invention. Display 1000 may include several images 1010 which may move as part of the screen saver. When the user selects an image 1010 that is displayed partially off the edge of screen 1000, for example by placing a cursor over a portion of the image, the electronic device may scroll the image on display 1000 and indicate that the image is selected using an approach described above. For example, in FIG. 10, in response to the user placing a cursor on image 1020, the electronic device may move the entire image 1020 onto the front of display 1000, pause the movement of image 1020 (which may be only partially displayed on screen 1000), illuminate image 1010 (e.g., as if a flashlight were pointed at image 1010), combinations thereof, or perform any other suitable operation.

The user may exit or disable the screen saver mode using any suitable approach. For example, while displaying several images (e.g., images 810 in FIG. 8), the user may provide a selection instruction (e.g., using an input mechanism embedded in the wand) on a portion of the display that does not include any images. As another example, the user may provide an EXIT, BACK or HOME instruction using an input mechanism of the wand (e.g., press an EXIT or HOME key on the wand). The electronic device may continue to play back a selected media item in response to receiving a request to exit the screen saver mode, or may instead pause or stop the played back media.

Figure 11:
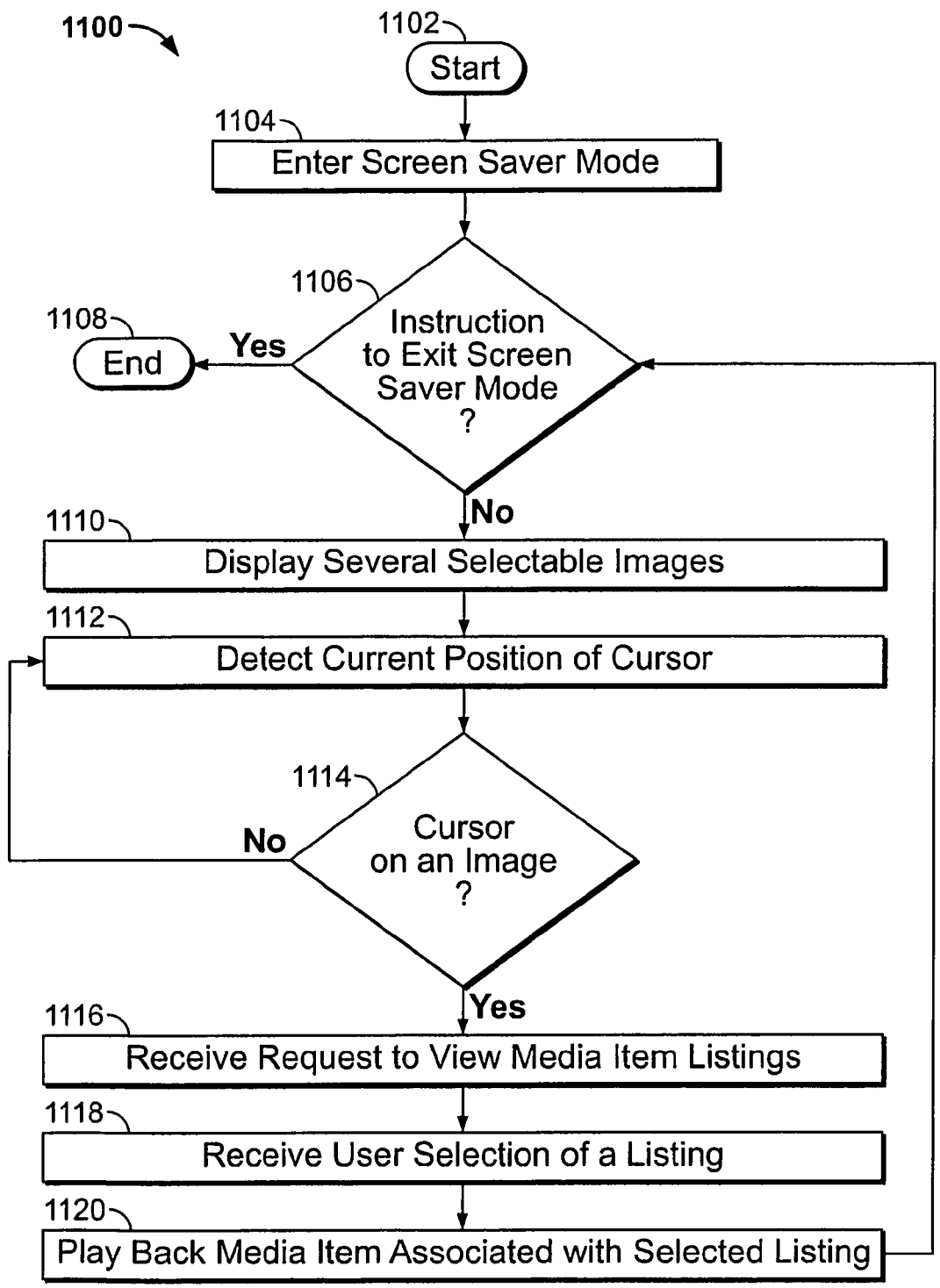
FIG. 11 is a flowchart of an illustrative process for selecting a media item to playback in a screen saver mode in accordance with one embodiment of the invention.

FIG. 11 is a flowchart of an illustrative process for selecting a media item to playback in a screen saver mode in accordance with one embodiment of the invention. Process 1100 may begin at step 1102. At step 1104, the electronic device may enter or enable a screen saver mode. For example, the electronic device may determine that the user has not provided any inputs for a particular amount of time, and enter a screen saver mode. As another example, the electronic device may receive a user request to enter the screen saver mode. At step 1106, the electronic device may determine whether an instruction to exit the screen saver mode has been received. For example, the electronic device may determine whether the user has provided an instruction to exit the screen saver mode (e.g., by selecting a particular portion of the display, or by selecting a HOME or BACK key on a wand associated with the electronic device). If the electronic device determines that the user provided an instruction to exit the screen saver mode, process 1100 may exit the screen saver mode and end at step 1108.

If, at step 1106, the electronic device instead determines that the user has not provided an instruction to exit the screen saver mode, process 1100 may move to step 1110. At step 1110, the electronic device may display several selectable images as part of the screen saver. Each selectable image may be associated with one or more media items (e.g., video or audio media items) selected by the electronic device using any suitable criteria (e.g., user-identified, most popular, recommended media items, recently played back, or favorite media items). In some embodiments, one or more of the selectable images may move on the display (e.g., at different speeds, and along different axes or directions). At step 1112, the electronic device may detect the current position of a cursor controlled by the user. For example, the electronic device may detect the movement of a wand associated with the electronic device, and may detect the current position of a cursor that is controlled by the movement of the wand. At step 1114, the electronic device may determine whether the cursor is displayed on an image. For example, the electronic device may determine whether the current position of the cursor is on one of the displayed images. If the electronic device determines that the cursor is not displayed on an image, process 1100 may return to step 1112 and continue to detect the current position of the cursor.

If, at step 1114, the electronic device instead determines that the cursor is located on an image, process 1100 may move to step 1116. At step 1116, the electronic device may receive a user request to view media item listings associated with the image on which the cursor is located. For example, in response to determining that the cursor is on an image (e.g., determining that an image has been selected), the electronic device may stop moving the image, and bring the image to the front of the display for viewing by the user. The user may subsequently provide an input, for example using an input mechanism of the wand, to view listings of the media items associated with the image. In response to receiving the user request to view the listings, the electronic device may display the listings of media items (e.g., instead of or in addition to the selected image).

At step 1118, the electronic device may receive a user selection of a particular listing. For example, the electronic device may determine that the user has placed a highlight region over a particular listing using the cursor, and has provided a selection instruction. At step 1120, the electronic device may play back the media item associated with the selected listing. For example, the electronic device may output the audio for a selected song or other musical piece. As another example, the electronic device may display a video window with the video clip or program for a selected video. Process 1100 may then return to step 1106 and determine whether the user has provided an instruction to exit the screen saver mode.

Figure 12A:
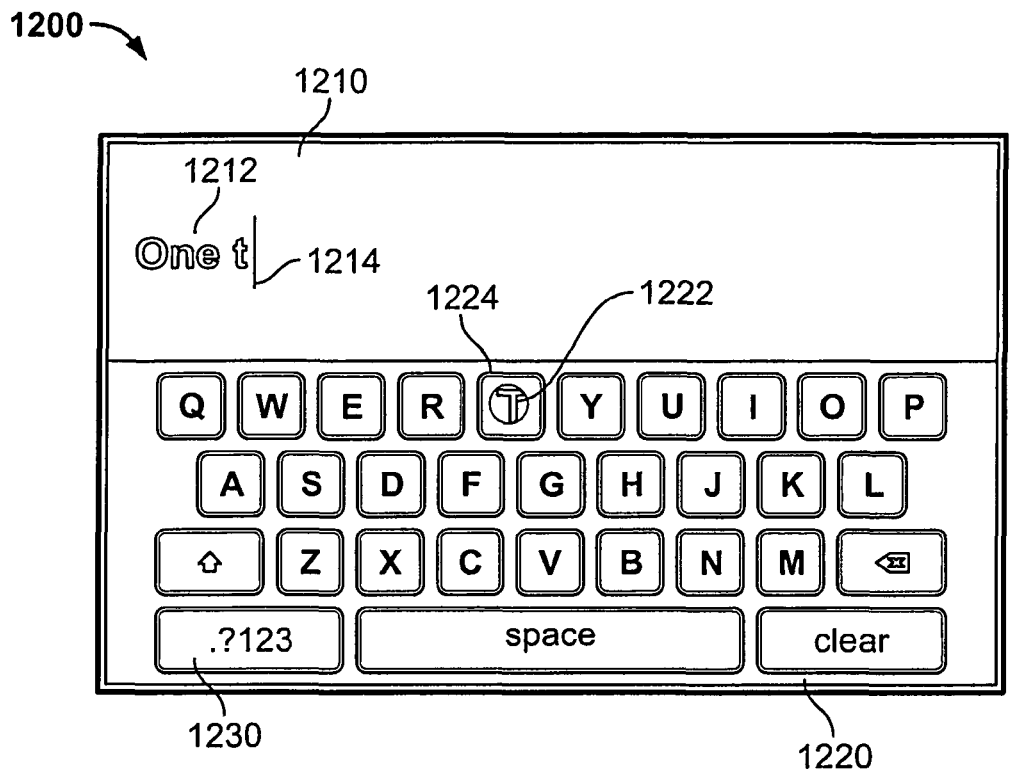
FIGS. 12A and 12B are schematic views of an illustrative keyboard for display by the electronic device in accordance with one embodiment of the invention.
Figure 12B:
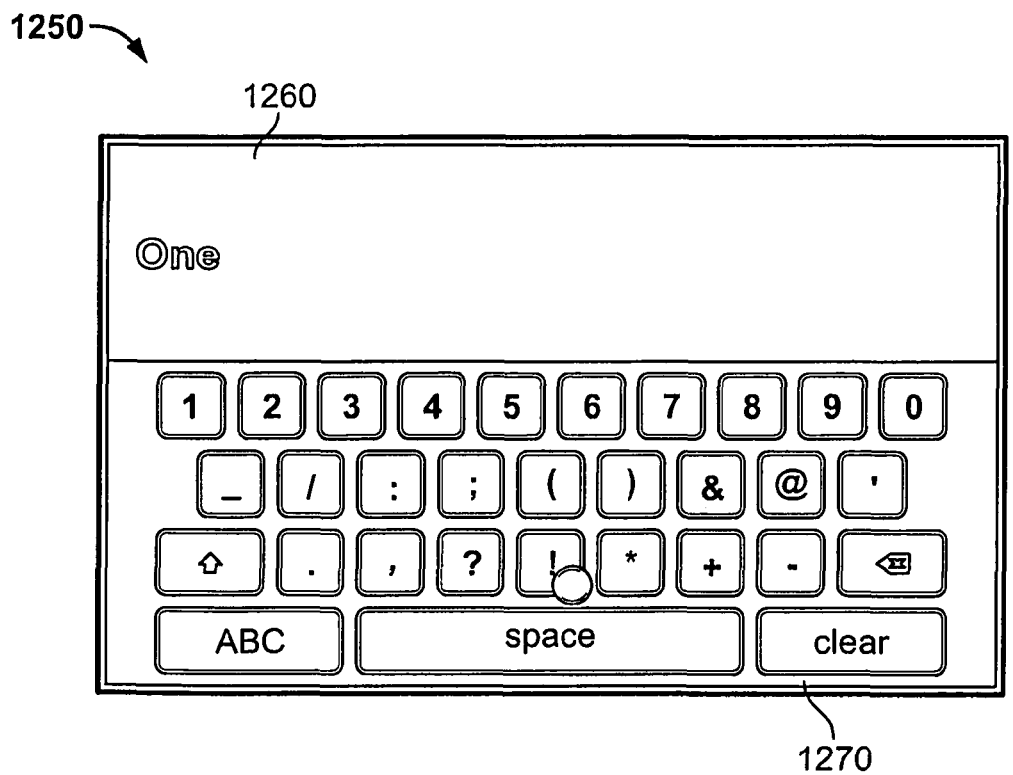

In some embodiments, the electronic device may enable the user to provide textual inputs. For example, the electronic device may provide applications for which the user may provide textual inputs. Such applications may include, for example, a word processing application, a web browser, an address book application, or any other suitable application in which a user may provide a textual input. In response to receiving a user request to provide a textual input (e.g., in response to the user placing the cursor on a text-entry portion of the display), the electronic device may display a virtual keyboard. FIGS. 12A and 12B are schematic views of an illustrative keyboard for display by the electronic device in accordance with one embodiment of the invention. Display 1200 may include text window 1210 and keyboard 1220. Text window 1210 may include text 1212 typed by the user, and marker 1214 indicating the current text input position of the electronic device. In some embodiments, marker 1214 may blink or be animated to indicate the current text input position. The user may move marker 1214 using any suitable approach, including for example by selecting marker 1214 using cursor 1222 and dragging marker 1214 across text 1212.

The user may select a particular character to enter in text window 1210 by placing cursor 1222 over a key 1224 and pending a selection input. The electronic device may indicate that a particular key is highlighted (e.g., that the cursor is placed over the particular key) using any suitable approach, including for example changing the color of the key (e.g., in FIG. 12A, the 'T' key is darker than the other keys of keyboard 1220). The electronic device may indicate that the user has selected a key to display the associated character in text window 1210 using any suitable approach. In some embodiments, the electronic device may change the display of the selected key (e.g., change the color or illumination of key 1224), or display a pop-up window with the key (e.g., a window with a larger key).

Keyboard 1220 may include any suitable character. In some embodiments, keyboard 1220 may include letters that the user may select. To access other characters, the user may select any suitable key (e.g., character key 1230) to display a different keyboard configuration. FIG. 12B is a schematic view of an illustrative keyboard displaying selectable characters in accordance with one embodiment of the invention. Display 1250 may include text window 1260 and keyboard 1270. In response to receiving a user selection of a character key (e.g., character key 1230, FIG. 12A), the electronic device may change the keys displayed in keyboard 1270 to display characters other than letters (e.g., numbers and punctuation marks).

The electronic device may change the keys displayed in the keyboard using any suitable approach. In some embodiments, the keyboard may change in response to receiving a user selection of a particular key (e.g., character key 1230), or in response to a user providing a particular input with the input mechanism (e.g., pressing a SHIFT or KEYBOARD key of the input mechanism). In some embodiments, the electronic device may change the displayed keyboard in response to receiving an input from a z-direction mechanism of the electronic device. For example, in response to detecting a user swiping a finger across a touchpad (e.g., in an up/down motion) or rolling a scroll-wheel, the electronic device may change the keys displayed in the keyboard. The input provided on the input mechanism may include any suitable type of input, including for example an input associated with providing a zoom instruction (e.g., zoom in to display numbers and punctuation marks, zoom out to display letters).

In some embodiments, the keys displayed in a keyboard may change based on the context of the application. For example, the electronic device may display a keyboard with keys that do not include a space bar in a web browser or email address application. As another example, the electronic device may display a keyboard that includes a ".com" key in a web browser application. As still another example, the electronic device may display a keyboard that includes number keys or a keypad in a telephone or text message application.

In some embodiments, one or more applications of the electronic device may include predictive spelling capabilities. The electronic device may provide predictive spelling functionality using any suitable approach. In some embodiments, the electronic device may predict the desired key by matching the previously selected keys with a database of common words, or may change previously selected characters to match a word in the database. As another example, the electronic device may predict or identify the key a user intended to select based on the dwell-time over a particular key, the number of times the user previously selected the key, the nature of the key (e.g., vowel or consonant), the movement or speed of the cursor as it moves across the keyboard, any combination of these, or any other suitable approach.

Figure 13A:
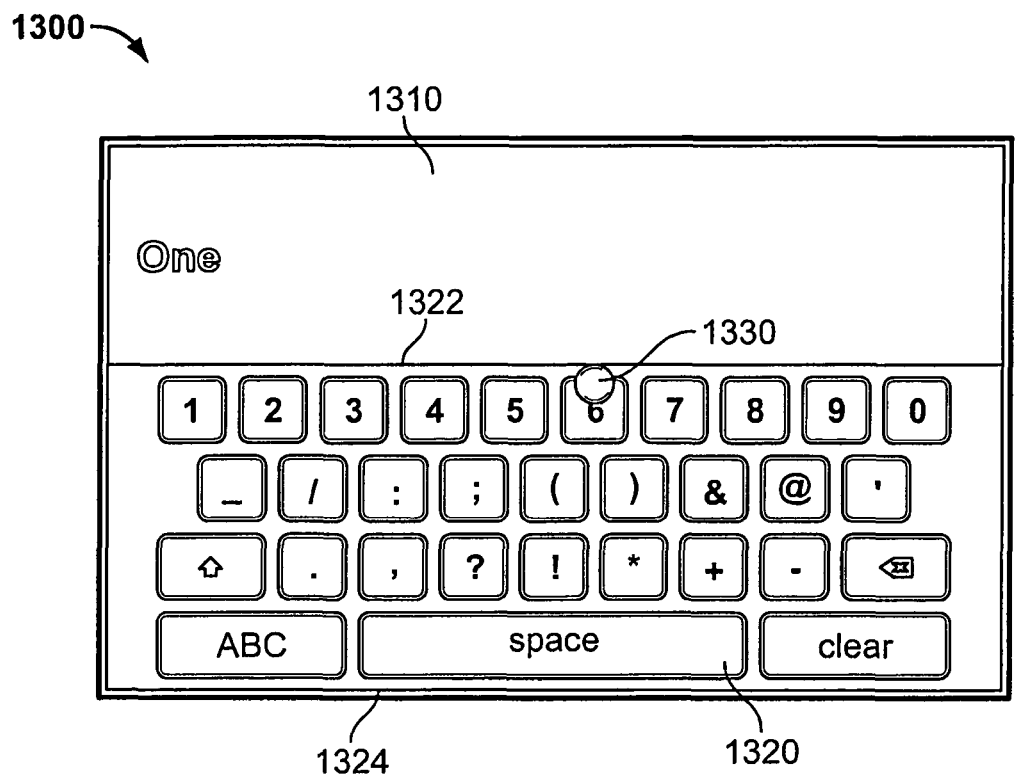
FIGS. 13A and 13B are schematic views of an illustrative keyboard in which the cursor movement is restrained in accordance with one embodiment of the invention.
Figure 13B:
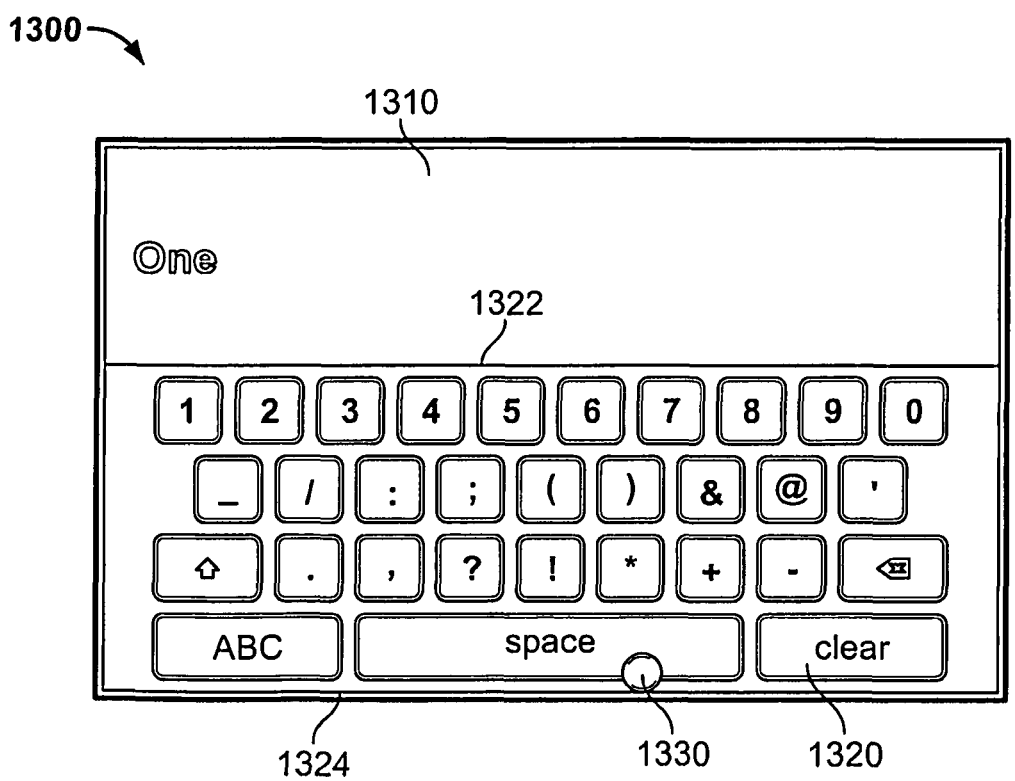

To assist the user in selecting keys displayed on the keyboard, the electronic device may selectively restrain the movement of the cursor to the keyboard portion of the display. FIGS. 13A and 13B are schematic views of an illustrative keyboard in which the cursor movement is restrained in accordance with one embodiment of the invention. Display 1300 may include text portion 1310 and keyboard 1320, which may be delimited by upper bound 1322 and lower bound 1324. The movement of cursor 1330 may be constrained between upper bound 1322 and lower bound 1324 such that when the user moves cursor 1330 towards the top or bottom of display 1300, the cursor highlights a key along the top or bottom edge of keyboard 1320, thus reducing overshoot issues.

The electronic device may allow the cursor to move beyond keyboard 1320 using any suitable approach. For example, the user may provide an input in addition to moving the wand (e.g., an input using an input mechanism) for extending beyond the keyboard. As another example, the user may select an on-screen icon for moving beyond the keyboard (e.g., an option for disabling overshoot control). As still another example, the electronic device may determine whether the user intended to move the cursor beyond the keyboard area or simply overshot a selected key by analyzing the direction and speed of the cursor movement (e.g., the motion vector of the cursor).

In some embodiments, the wand may provide tactile or other feedback to the user of the electronic device. The wand may provide tactical feedback using any suitable approach. For example, the wand may vibrate in response to the rotation of a motor coupled to an unbalanced cam, or to the activation of any other vibrating mechanism. As another example, one or more lights of the wand may be illuminated. The electronic device may direct the wand to provide tactile feedback in any suitable context or configuration. For example, the wand may provide feedback to indicate to the user that a selection instruction was received. As another example, the wand may provide feedback to indicate that the cursor reached a boundary (e.g., was moved into upper bound 1332 or lower bound 1334), or that the wand is drifting (e.g., the user let his hand drift). As still another example, the wand may provide feedback to indicate that a particular option was selected (e.g., a particular icon or image was selected).

Figure 14:
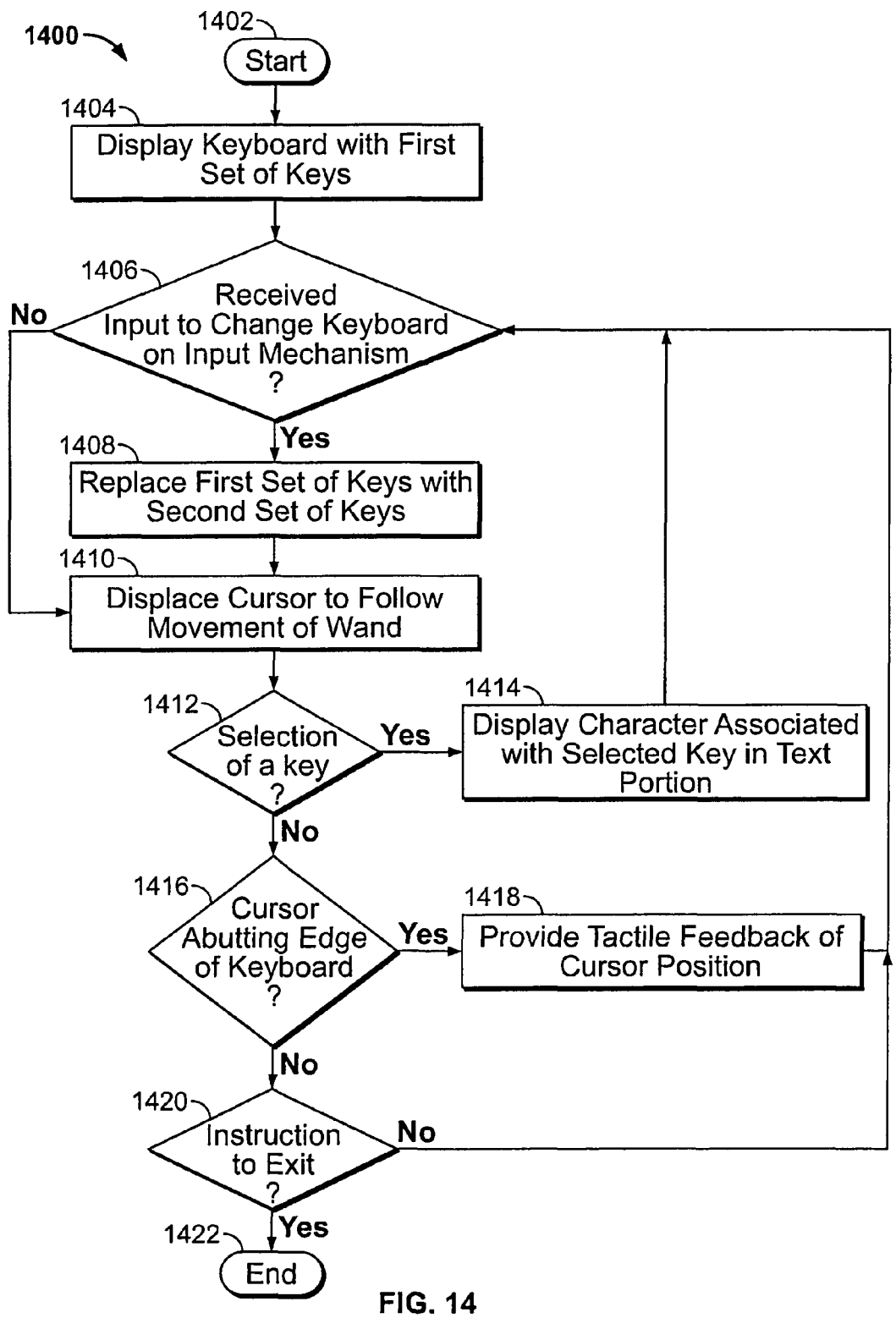
FIG. 14 is a flowchart of an illustrative process for changing the keys of a virtual keyboard in accordance with one embodiment of the invention.

FIG. 14 is a flowchart of an illustrative process for changing the keys of a virtual keyboard in accordance with one embodiment of the invention. Process 1400 may begin at step 1402. At step 1404, the electronic device may display a keyboard with a first set of keys. For example, the electronic device may display a virtual keyboard with keys representing letters. As another example, the electronic device may display a virtual keyboard with keys representing numbers and punctuation marks. At step 1406, the electronic device may determine whether an input was received to change the keyboard on an input mechanism of a wand associated with the electronic device. For example, the electronic device may determine whether the wand provided an input to change the characters displayed in the virtual keyboard. The received input may include any suitable type of input. For example, the input may include a finger swipe across a touch screen or touchpad, or a press of a button or key on the wand. As another example, the input may include rolling a scroll wheel. As still another example, the input may include a user selection of an on-screen display (e.g., a character key). If the electronic device determines that the wand received an input to change the keyboard on an input mechanism of the wand, process 1400 may move to step 1408.

At step 1408, the electronic device may replace the displayed keys with a second set of keys. For example, the electronic device may replace a first set of keys associated with letters with a second set of keys associated with numbers and punctuation marks. Process 1400 may then move to step 1410. If, at step 1406, the electronic device instead determines that the wand has not received an input on an input to change the keyboard mechanism of the wand, process 1400 may move to step 1410.

At step 1410, the electronic device may displace a cursor on the screen to follow the movement of the wand associated with the electronic device. For example, the electronic device may receive an output of one or more motion detection components and determine the amount and direction by which to move the cursor based on the received output such that the movement of the cursor matches the movement of the wand (e.g., as detected by the motion sensing component output). At step 1412, the electronic device may determine whether the user has provided a selection instruction. For example, the electronic device may determine whether the wand received a selection instruction from the user (e.g., whether the user moved the wand in a particular manner, or whether the user provided an input using an input mechanism). If the electronic device determines that the user has provided a selection instruction, process 1400 may move to step 1414. At step 1414, the electronic device may display a character associated with a selected key in a text portion of the display. For example, in response to determining that the user provided a selection instruction while placing the cursor over a particular key of the keyboard, the electronic device may display the character associated with the particular key. Process 1400 may then return to step 1406 to determine whether the user provided an input on an input mechanism.

If, as step 1412, the electronic device instead determines that the user has not provided a selection instruction, process 1400 may move to step 1416. At step 1416, the electronic device may determine whether the cursor abuts an edge of the keyboard. For example, the electronic device may identify the borders or bounds of the keyboard, and determine whether the cursor abuts one or more of the identified borders or bounds. If the electronic device determines that the cursor abuts an edge of the keyboard, process 1400 may move to step 1418. At step 1418, the electronic device may provide tactile feedback of the cursor position. For example, the wand associated with the electronic device may vibrate in response to determining that the user moved the cursor against an edge of the keyboard. Process 1400 may then return to step 1406 to determine whether the user provided an input to change the keyboard on an input mechanism.

If, at step 1416, the electronic device instead determines that the cursor does not abut an edge of the keyboard, process 1400 may move to step 1420. At step 1420, the electronic device may determine whether the an instruction to exit the keyboard mode was provided. For example, the electronic device may determine whether the user provided an input using the input mechanism of the wand to exit the keyboard mode (e.g., the user provided an EXIT instruction, or selected a portion of the screen that is not associated with text entry). If the electronic device determines that no instruction to exit the keyboard mode was provided, process 1400 may return to step 1406 to determine whether the user provided an input on an input mechanism. If, at step 1420, the electronic device instead determines that an instruction to exit the keyboard mode was provided, process 1400 may move to step 1422 and end.

Figure 15:
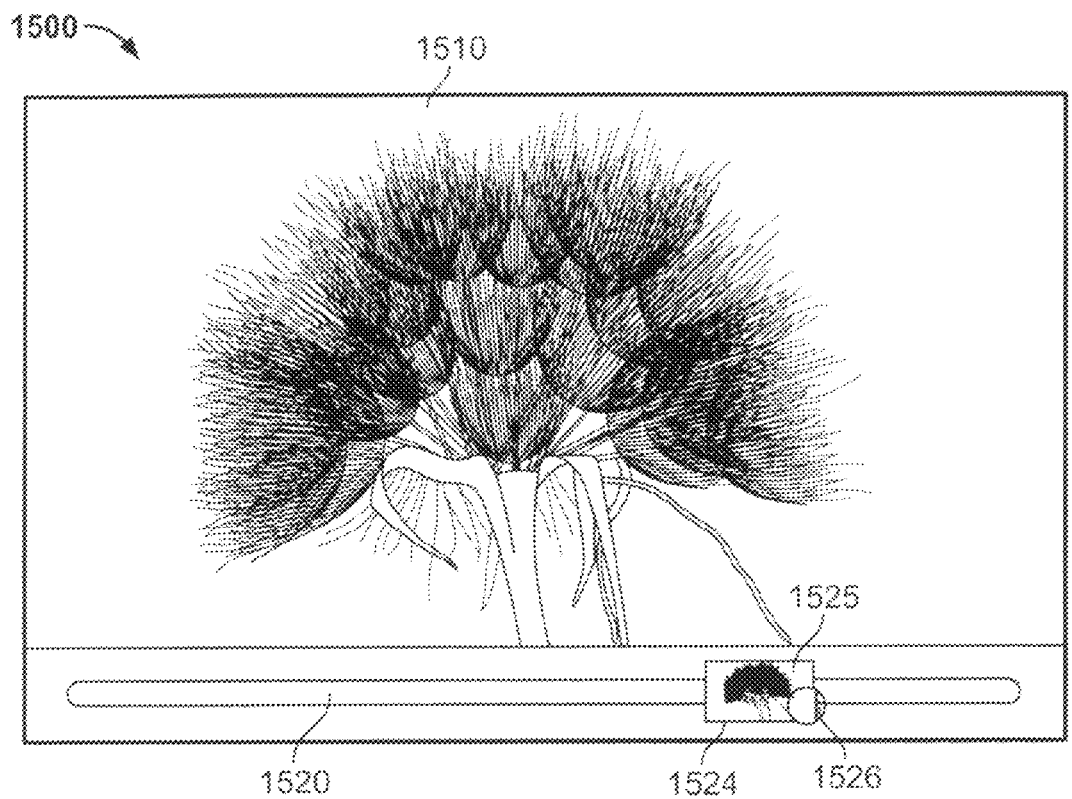
FIG. 15 is a schematic display of an illustrative media display in accordance with one embodiment of the invention. Display 1500 may include media 1510 in a large display.

The electronic device may display any suitable media on the display. For example, the electronic device may display video, including for example movies, video clips, music videos, or any other combination of image and audio. FIG. 15 is a schematic display of an illustrative media display in accordance with one embodiment of the invention. Display 1500 may include media 1510 in a large display. For example, media 1510 may be displayed in full screen or in substantially full screen. The user may control the playback of media 1510 using any suitable approach. In some embodiments, the user may direct the electronic device to display scroll bar 1520 representative of the displayed media playback position. The electronic device may display scroll bar 1520 in response to any suitable user instruction. For example, the electronic device may display scroll bar 1520 in response to a user input on an input mechanism of the wand (e.g., a click of a button), a particular wand movement (e.g., a wand movement for pausing the media), or any other suitable wand input. As another example, the electronic device may display scroll bar 1520 in response to receiving a user instruction to stop or pause the media (e.g., if the wand includes a single button, in response to receiving a click of the single button).

Figure 16:
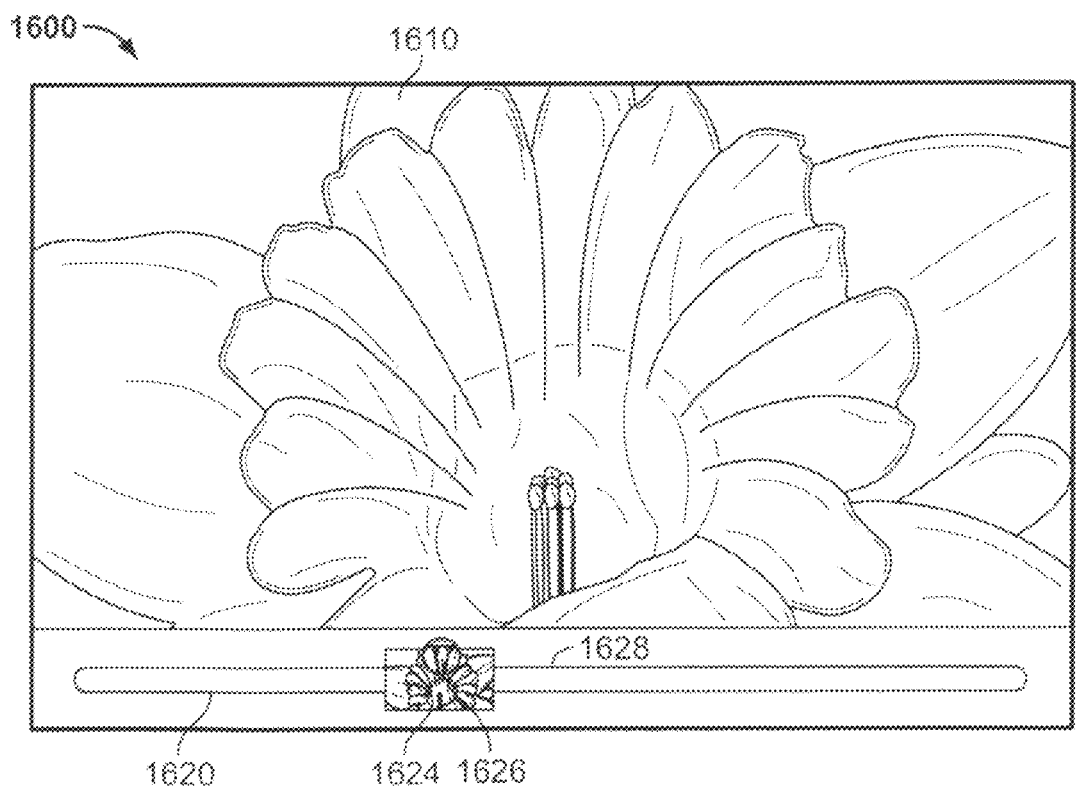
FIG. 16 is a schematic display of media as the playback position is changed in accordance with one embodiment of the invention.

The user may select a particular playback position for the media by moving indicator 1524 to a particular position on scroll bar 1520. For example, if the user wishes to view a portion of the media that is behind of the current playback position, the user may select indicator 1524 and slide indicator 1524 to the desired playback position to the left (e.g., behind) of the current playback position (e.g., identified by the limited position of indicator 1524). FIG. 16 is a schematic display of media as the playback position is changed in accordance with one embodiment of the invention. Display 1600 may include media 1610 in a large display. In some embodiments, media 1610 may be the same as media 1510, but at a different playback position. Display 1600 may include scroll bar 1620, which may identify the current playback position using indicator 1624.

The user may direct the electronic device to displace indicator 1524 (or 1624) using any suitable approach. For example, once the user has placed cursor 1526 (or 1626) over the indicator, the user may provide a selection input (e.g., press and release a button, or swipe a finger across a touch screen or touchpad) to hold the indicator (e.g., and release with a second selection input or a release input). As the user moves the wand to direct the electronic device to displace cursor 1526 (or 1626), the electronic device may displace indicator 1524 (or 1624). As another example, the user may provide and hold a selection input (e.g., press and hold a button, or continue to swipe a finger across a touch screen or touchpad). The electronic device may drag the cursor and indicator based on the movements of the wand until the user releases the selection input (e.g., the user releases the previously held button, or ceases to swipe a finger on the touch screen or touchpad). As still another example, the user may place cursor 1526 over a particular section of scroll bar 1520 and provide a selection input. In response to receiving the selection instruction, the electronic device may direct indicator 1524 to jump to the location of cursor 1526 when the selection input was received.

The electronic device may indicate the movement of indicator 1624 using any suitable approach. For example, the electronic device may update the portion of media 1610 displayed in display 1600 to reflect the current position of indicator 1624 as it is displaced (e.g., as a fast-forward or rewind media display that may or may not include audio). As another example, the electronic device may display trail 1628 associated with cursor 1626 that indicates the prior position of the cursor. In some embodiments, trail 1628 may include some or all of the features of trail 304 (FIG. 3) described above. By allowing the user to place indicator 1524 on any portion of scroll bar 1520, and by allowing the user to drag indicator 1524 along scroll bar 1520 at any suitable speed (e.g., at the speed at which cursor 1526 moves), the user may control the playback of media 1510 without the use of fast forward, rewind, next chapter, and last chapter keys.

The electronic device may display any suitable indicator 1524 (and 1624). In some embodiments, the indicator may include video region 1525 in which a video frame or image of the displayed media (e.g., media 1510) may be displayed. For example, indicator 1524 may include a reduced size video region for previewing media when the user changes the playback position. The images displayed in video region 1525 may represent the current position of indicator 1524 along scroll bar 1520, and may change as the user moves indicator 1524 to provide a preview of the media to the user. In some embodiments, while the user moves indicator 1524, media 1510 may not change in display 1500 or may be hidden from view (e.g., a blank screen) until the user stops moving indicator 1524. Once indicator 1524 stops moving, the electronic device may display the corresponding image of video region 1525 in display 1500. In some embodiments, the electronic device may initially display the image of video region 1525 (e.g., a scaled up low-resolution image), and subsequently identify and display the corresponding full-resolution image of media 1510.

The electronic device may generate the images to display in video region 1525 using any suitable approach. In some embodiments, the electronic device may generate the images for display in video region 1525 in real-time as the user moves indicator 1524. For example, the electronic device may detect the current position of indicator 1524, identify the portion of media 1510 associated with the current position of indicator 1524, reduce the size of the portion of media 1510, and display the reduced size portion of the media in video region 1525. In some embodiments, the electronic device may instead prepare the images for display in video region 1525 before beginning playback. In response to a user request to scroll indicator 1524 and video region 1525, the electronic device may display the previously prepared images in video region 1525 (e.g., retrieve a particular previously prepared image based on the position of the indicator). For example, the electronic device may select the images to display from media 1510 prior to starting playback of the media (e.g., after the user selects the media) or while the electronic device begins to play back the media (e.g., during the first 30 seconds of playback).

The electronic device may store the images to display in video region 1525 using any suitable approach, including for example as a video, sequence of images, images associated with several video frames of media, or any other suitable approach. The stored images (or video frames) may be associated with particular portions of scroll bar 1520 or with particular positions of indicator 1524 using any suitable approach, including for example associating images with a playback time range (e.g., from 30 minutes, 10 seconds to 30 minutes, 35 seconds), a particular section of the displayed scroll bar (e.g., define several sections of the scroll bar, where a particular image is displayed when the indicator moved to the section of the scroll bar), media frames of the media (e.g., one image associated with several media frames), or any others suitable approach.

The electronic device may select any suitable subset of media 1510 for display in video region 1525. In some embodiments, the electronic device may select any suitable number of video frames of the media at different intervals for display in video region 1525. For example, the electronic device may select 1% of the video frames of the media at regular or near regular intervals of the media (e.g., if the media is 99 minutes long, select 100 video frames at each minute mark). When the user moves indicator 1524 across scroll bar 1520, the electronic device may identify the extracted video frame or image that is closest to the current position of indicator 1524 for display in video region 1525. For example, the electronic device may identify the video frame associated with the current playback position value (e.g., the video frame associated with the minute/second value of the playback position), or may use any of the approaches described above for associating a video frame or an image with a indicator position.

Figure 17:
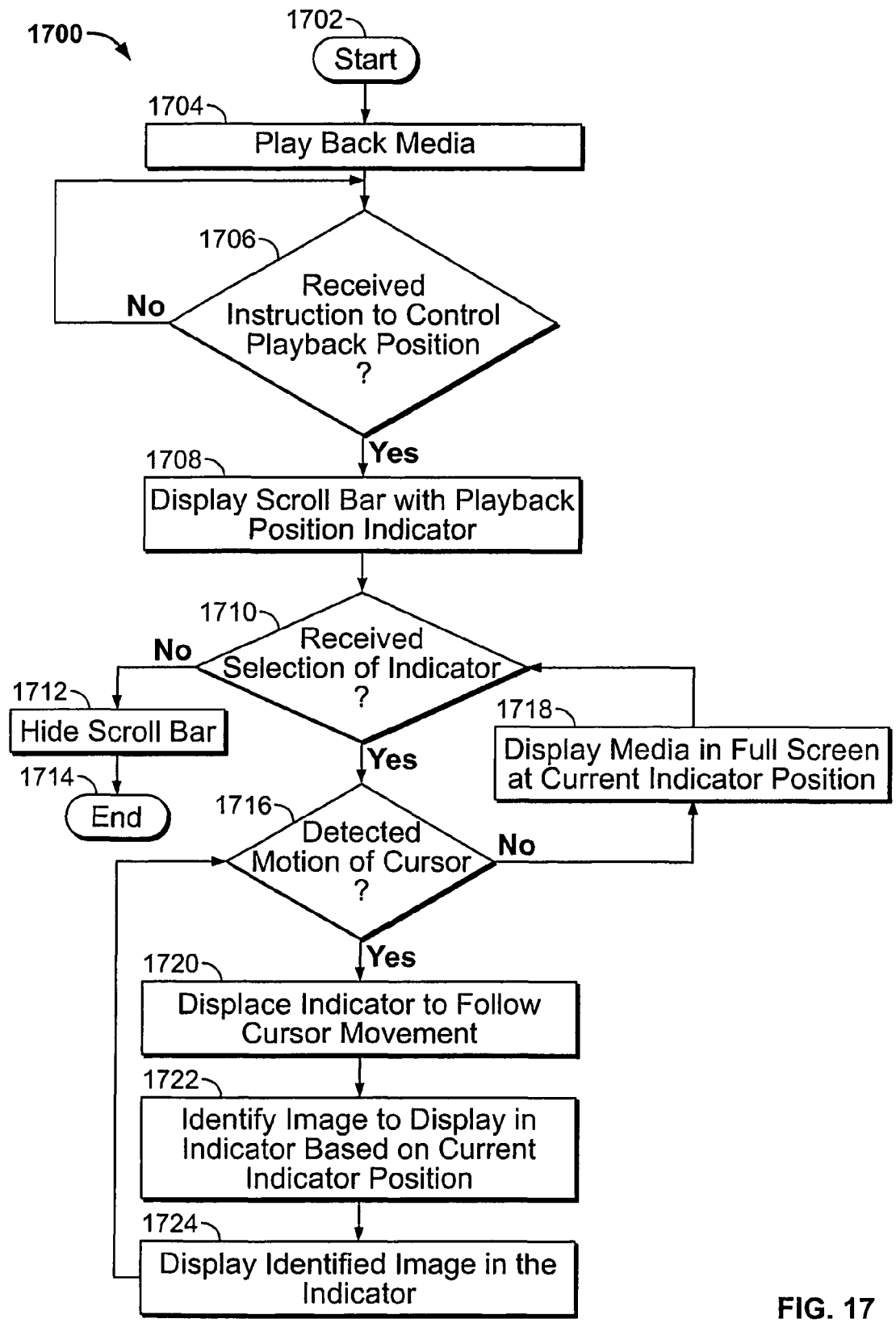
FIG. 17 is a flowchart of an illustrative process for changing the playback position of media in accordance with one embodiment of the invention.

FIG. 17 is a flowchart of an illustrative process for changing the playback position of media in accordance with one embodiment of the invention. Process 1700 may begin at step 1702. At step 1704, the electronic device may play back media. For example, the electronic device may play back a video by displaying the video in the display and providing the audio output associated with the video to the user using an audio output component. The played back media may include any suitable media, including for example media selected by the user (e.g., using a media playback application), media from the screen saver application, or any other suitable media. At step 1706, the electronic device may determine whether an instruction to control the playback position were received. For example, the electronic device may determine whether an input associated with controlling the playback position was received from a wand associated with the electronic device. The received input may include any suitable received input, such as for example a user input on an input mechanism of the wand, or a particular movement of the wand (e.g., the wand tracing a particular pattern) associated with controlling the playback position of the media (e.g., play/pause, fast-forward or rewind). If the electronic device determines that no instruction to control the playback position was received, process 1700 may return to step 1706 and continue to monitor the inputs received by the electronic device.

If, at step 1706, the electronic device instead determines that an instruction to control the current playback position was received, process 1700 may move to step 1708. At step 1708, the electronic device may display a scroll bar (e.g., representing the entire length of the media) with a playback position indicator. For example, the electronic device may overlay the scroll bar on the played back media (which may or may not be paused or stopped). The user may change the playback position of the media using any suitable approach. In some embodiments, the user may provide an input to change the position on the scroll bar of the playback position indicator. At step 1710, the electronic device may determine whether the displayed indicator was selected. For example, the electronic device may determine whether the user placed a cursor over the indicator. As another example, the electronic device may determine whether the user placed a cursor over the indicator and provided a selection input (e.g., pressed and released a button on the wand, or pressed and held a button on the wand). If the electronic device determines that the displayed indicator was not selected, process 1700 may move to step 1712. At step 1712, the electronic device may hide the scroll bar. For example, the electronic device may remove the scroll bar overlaid on the media. If the media was stopped or paused, the electronic device may automatically elect to resume playback of the media (for example, from the playback position when the instruction to control the playback position was received). Process 1700 may then end at step 1714.

If, at step 1710, the electronic device instead determines that the displayed indicator was selected, process 1700 may move to step 1716. At step 1716, the electronic device may determine whether cursor motion was detected. For example, the electronic device may determine whether an output from a motion detection component of the wand was received. As another example, the electronic device may determine whether an input on an input mechanism of the wand was provided (e.g., a z-direction input). If the electronic device determines that no cursor motion was detected, process 1700 may move to step 1718. At step 1718, the electronic device may display the media in full screen at the selected indicator position. For example, the electronic device may continue or resume playback of the media from the current position of the indicator in the scroll bar. Process 1700 may then return to step 1710 and determine whether a selection of the indicator was received.

If, at step 1716, the electronic device instead determines that cursor motion was detected, process 1700 may move to step 1720. At step 1720, the electronic device may displace the indicator to follow the detected cursor movement. For example, the electronic device may slide or displace the indicator along or across the scroll bar to follow the movement of the cursor—if the cursor moves to the right, the electronic device may displace the indicator to the right. At step 1722, the electronic device may identify an image to display in the indicator based on the current position of the indicator. For example, the electronic device may identify a particular video frame to display in a video region of the indicator. The electronic device may select the particular image to display in the indicator using any suitable approach. In some embodiments, the electronic device may extract video frames of the media at different intervals of the media, and display the video frame that is closest to the portion of the media associated with the current position of the indicator in the scroll bar. The electronic device may use any suitable approach to associate images or video frames with particular indicator positions, including any of the approaches described above.

At step 1724, the electronic device may display the identified image in the indicator. For example, the electronic device may display the image identified at step 1722 in the video region of the indicator. Process 1700 may then move back to step 1716 and continue to identify cursor movements and the associated current position of the indicator. This may allow the image displayed in the indicator to be constantly updated, providing a preview of the media as the user fast-forwards or rewinds by dragging the indicator.

The above described embodiments of the present invention are presented for purposes of illustration and not of limitation, and the present invention is limited only by the claims which follow.

What is claimed is:

1. A method for scrolling a plurality of displayed objects using an input mechanism, the method comprising:
   displaying a plurality of objects;
   receiving a first input comprising a first linear swipe on the input mechanism along a first direction;
   scrolling the display of the plurality of objects using a first type of scrolling in response to receiving the first linear swipe;
   receiving a second input comprising a second linear swipe on the input mechanism along a second direction at an angle from the first direction; and
   scrolling the display of the plurality of objects using a second type of scrolling different than the first type of scrolling and along the same direction as the first type of scrolling in response to receiving the second linear swipe.

2. The method of claim 1, wherein the first type of scrolling comprises coarse scrolling, and the second type of scrolling comprises fine scrolling.

3. The method of claim 1, wherein the first type of scrolling comprises scrolling, and the second type of scrolling comprises paging.

4. The method of claim 1, wherein the first type of scrolling comprises scrolling, and the second type of scrolling comprises jumping to a chapter marker.

5. The method of claim 1, wherein the first type of scrolling comprises scrolling through the displayed objects, and the second type of scrolling comprises scrolling through categories of objects.

6. The method of claim 5, wherein scrolling the display using the second type of scrolling further comprises:
receiving a selection of a new category in response to receiving the second linear swipe; and
displaying a plurality of objects associated with the new category.

7. The method of claim 6, wherein displaying a plurality of objects associated with the new category further comprises removing from display the plurality of objects displayed prior to receiving the second linear swipe.

8. The method of claim 1, wherein the first linear swipe and the second linear swipe each comprise a swipe of the user's finger on the input mechanism.

9. The method of claim 8, wherein the swipe of the user's finger associated with the first linear swipe is in a different axis than the swipe of the user's finger associated with the second linear swipe.

10. The method of claim 8, wherein the swipe of the user's finger associated with the first linear swipe is a horizontal swipe, and the swipe of the user's finger associated with the second linear swipe is a vertical swipe.

11. The method of claim 1, wherein the input mechanism comprises at least one of a touch screen and a touchpad.

12. A method for controlling the playback of media using an input mechanism, the method comprising:
displaying a plurality of media objects available for playback;
receiving a first input comprising a first linear swipe in a vertical manner across the input mechanism;
performing a first playback operation in response to receiving the first linear swipe;
receiving a second input comprising a second linear swipe in a horizontal manner across the input mechanism; and
performing a second playback operation different than the first playback operation in response to receiving the second linear swipe.

13. The method of claim 12, wherein the first playback operation is one of fast-forward and rewind, and the second playback operation is one of skip forward and skip backward.

14. The method of claim 12, further comprising:
receiving a third input comprising a first finger substantially immobile on the input mechanism and a simultaneous swipe of another finger across the input mechanism; and
performing a third playback operation in response to receiving the third input.

15. The method of claim 14, wherein the third playback operation comprises controlling the volume of the played back media.

16. The method of claim 12, wherein:
the first and second inputs each comprise a linear swipe of the user's finger; and
the axis of the linear swipe associated with the first input is different than the axis of the swipe associated with the second input.

17. The method of claim 16, wherein the axes associated with the first and second inputs are perpendicular axes.

18. An electronic device operative to display a plurality of objects, the electronic device coupled to a wand comprising an input mechanism, the electronic device comprising a processor, the processor operative to:
provide an output signal representing a plurality of objects;
receive a first input comprising a first linear swipe of a user's finger in a first axis across the input mechanism;
provide an output signal scrolling the displayed plurality of objects in a first manner in response to receiving the first linear swipe;
receive a second input comprising a second linear swipe of a user's finger in a second axis at an angle from the first axis across the input mechanism; and
provide an output signal scrolling the plurality of objects in a second manner different than the first manner and along the same direction as the first manner in response to the second linear swipe.

19. The electronic device of claim 18, wherein the processor is further operative to:
receive a third input from the input mechanism;
determine which of the first and second axes is associated with the received third input; and
provide an output signal scrolling the display of the plurality of objects using the manner of scrolling associated with the determined one of the first and second axes associated with the received third input in response to determining.

20. The electronic device of claim 18, wherein the wand further comprises a motion detection component, wherein the processor is further operative to:
provide an output signal representing a cursor;
receive an output associated with a particular movement of the wand from the motion detection component; and
provide an output signal changing the position of the cursor on the display based on the received output in response to receiving the output.

21. A wand for use with an electronic device, comprising:
an input device associated with at least two axes of swipes for detecting a linear swipe of a user's finger; and
communications circuitry for providing information to the electronic device for a swipe received by the input mechanism, wherein the electronic device scrolls the display of a plurality of objects using different types of scrolling along a same direction of scrolling based on the axis associated with the received linear swipe.

22. The wand of claim 21, wherein the input is further operative to:
detect a swipe of a user's finger;
determine the particular axis of the at least two axes associated with the detected swipe; and
identify the determined particular axis to the communications circuitry for providing to the electronic device.

23. The wand of claim 22, wherein the input is further operative to:
determine the particular axis of the at least two axes that most closely reflects the detected swipe.

24. The wand of claim 21, wherein the input is further operative to:
detect a swipe of a user's finger;

determine the amount of each of the at axes associated with the detected swipe; and identify the amount of the detected swipe associated with each of the at least two axes to the communications circuitry for providing to the electronic device.

25. The wand of claim 21, wherein the input mechanism further comprises at least one of a touch screen and a touchpad.

\* \* \* \* \*